(12) United States Patent
Akuzawa

(10) Patent No.: US 7,717,086 B2
(45) Date of Patent: May 18, 2010

(54) CONTROLLER FOR BOAT PROPULSION UNIT

(75) Inventor: Shu Akuzawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 317 days.

(21) Appl. No.: 12/033,157

(22) Filed: Feb. 19, 2008

(65) Prior Publication Data

US 2008/0196692 A1    Aug. 21, 2008

(30) Foreign Application Priority Data

Feb. 19, 2007    (JP) .............................. 2007-037412

(51) Int. Cl.
F02D 9/08    (2006.01)
F02D 41/04    (2006.01)
F02D 11/10    (2006.01)
F02M 35/10    (2006.01)

(52) U.S. Cl. ................. 123/402; 123/184.54; 123/396; 123/478

(58) Field of Classification Search ............ 123/184.21, 123/184.54, 396, 402, 403, 478, 479, 480; 701/103–105, 114

See application file for complete search history.

(56) References Cited

U.S. PATENT DOCUMENTS 4,796,584 A * 1/1989 Goto et al. .................. 123/403
4,875,456 A * 10/1989 Tomisawa ................... 123/585
6,834,627 B2 * 12/2004 Hiraku et al. ............. 123/90.15
7,213,550 B2 * 5/2007 Nishida ....................... 123/403
2009/0012672 A1 * 1/2009 Dingl et al. .................... 701/29

FOREIGN PATENT DOCUMENTS

| EP | 1655466 A1 * | 5/2006 |
| JP | 05086939 A * | 4/1993 |
| JP | 05-312066 A | 11/1993 |
| JP | 2002-285900 A | 10/2002 |

* cited by examiner

Primary Examiner—Willis R Wolfe, Jr.
(74) Attorney, Agent, or Firm—Keating & Bennett, LLP

(57) ABSTRACT

A boat propulsion unit controller includes a switch arranged to switch between a long intake duct and a short intake duct for drawing air into an engine of a boat propulsion unit, a motor-operated driver arranged to drive the switch, a duct length switching position sensor arranged to detect the position of the switch at the time of switching the duct length, a fuel supply arranged to supply fuel to the engine, a sensor failure detector arranged to detect failure of the duct length switching position sensor based on its output, and a controller arranged to compensate the fuel supply rate based on the position of the switch detected at the time of duct length switchover. A controller, when the duct length switching position sensor fails, takes the action of switching to the long intake duct and compensates the fuel supply rate using a sensor output quasi value corresponding to the time of switchover to the long intake duct. Engine performance may be maintained as much as possible even when duct length switchover fails due to frequent duct length switchover actions.

6 Claims, 19 Drawing Sheets

FIG. 7

Basic fuel injection rate map

| Intake pressure (mmhg) / Engine revolution (rpm) | 1 (mmhg) | 2 (mmhg) | 3 (mmhg) | 4 (mmhg) | 5 (mmhg) | 6 (mmhg) | * | * | * | * | 20 (mmhg) |
|---|---|---|---|---|---|---|---|---|---|---|---|
| 100 (rpm) | 5 | 6 | * | * | * | * | * | * | * | * | 10 |
| 500 (rpm) | 6 | | | | | | | | | | |
| 1000 (rpm) | 10 | | | | | | | | | | |
| * | * | | | | | | | | | | |
| * | * | | | | | | | | | | |
| * | * | | | | | | | | | | |
| * | * | | | | | | | | | | |
| * | * | | | | | | | | | | |
| 5000 (rpm) | 90 | | | | | | | | | | |
| 8000 (rpm) | 100 | | | | | | | | | | |

Long duct compensation map

| Intake pressure (mmHg) / Engine revolution (rpm) | 1 (mmHg) | 2 (mmHg) | 3 (mmHg) | 4 (mmHg) | 5 (mmHg) | 6 (mmHg) | * | * | * | * | 20 (mmHg) |
|---|---|---|---|---|---|---|---|---|---|---|---|
| 100 (rpm) | 0.1 | 0.2 | * | * | * | * | * | * | * | * | 1 |
| 500 (rpm) | 0.2 | | | | | | | | | | |
| 1000 (rpm) | 1 | | | | | | | | | | |
| * | * | | | | | | | | | | |
| * | * | | | | | | | | | | |
| * | * | | | | | | | | | | |
| * | * | | | | | | | | | | |
| * | * | | | | | | | | | | |
| 5000 (rpm) | 9 | | | | | | | | | | |
| 6000 (rpm) | 10 | | | | | | | | | | |

(B)

Short duct compensation map

| Intake pressure (mmHg) / Engine revolution (rpm) | 1 (mmHg) | 2 (mmHg) | 3 (mmHg) | 4 (mmHg) | 5 (mmHg) | 6 (mmHg) | * | * | * | * | 20 (mmHg) |
|---|---|---|---|---|---|---|---|---|---|---|---|
| 100 (rpm) | 0.2 | 0.66 | 3* | * | * | * | * | * | * | * | 2 |
| 500 (rpm) | 0.3 | | | | | | | | | | |
| 1000 (rpm) | 2 | | | | | | | | | | |
| * | * | | | | | | | | | | |
| * | * | | | | | | | | | | |
| * | * | | | | | | | | | | |
| * | * | | | | | | | | | | |
| * | * | | | | | | | | | | |
| 5000 (rpm) | 10 | | | | | | | | | | |
| 6000 (rpm) | 11 | | | | | | | | | | |

(A)

(B)

(A)

(B)

US 7,717,086 B2

CONTROLLER FOR BOAT PROPULSION UNIT

BACKGROUND OF THE INVENTION

1. Field of the Invention

The present invention relates to a controller for switching between a long duct and a short duct for drawing intake air into an engine.

2. Description of the Related Art

A method is conventionally known to detect a failure in a control valve for controlling the amount of intake air into an engine, as described in JP-A-2002-285900. According to the known method, the control valve is operated by pressure in a vacuum tank. In a case in which the period of time during which a signal is being sent to the control valve for operating the control vale is longer than the period of time required for actually operating the control valve according to the operating state of the engine, the control valve is determined to have failed. Another known method is described in JP-A-H5-312066. According to this known method, when the engine revolution is between a first preset revolution and a second preset revolution, the opening state of the valve for switching between a long intake duct and a short intake duct is detected with an opening state detector. Then, according to the engine revolution, throttle opening degree, and the opening state of the valve, and based on a preset fuel injection rate, a fuel injection rate corresponding to the engine revolution at the time is calculated. Then, a fuel injection device is controlled to inject fuel into the engine at the calculated injection rate.

As an outboard motor is often operated at a high load and high revolution, the negative pressure type of actuator as disclosed in JP-A-2002-285900 sometimes cannot cope with the frequent switchover. On the other hand, the structure disclosed in JP-A-H5-312066 does not include controlling in an emergency, such as in the case of a failure of the valve, to compensate the fuel supply rate corresponding to the operation of the valve.

SUMMARY OF THE INVENTION

In order to overcome the problems described above, preferred embodiments of the present invention provide an outboard motor propulsion unit controller that makes it possible to maintain as much as possible the engine performance even if the duct length switchover fails due to frequent duct length switchover.

A controller for a boat propulsion unit according to a preferred embodiment of the present invention includes a switch arranged to switch between a long intake duct and a short intake duct for drawing intake air into the engine of the boat propulsion unit, a motor-operated driver arranged to drive the switch, a duct length switching position sensor arranged to detect the position of the switch at the time of switching the duct length, a fuel supply arranged to supply fuel to the engine, a sensor failure detector arranged to detect a failure of the duct length switching position sensor based on the output from the duct length switching position sensor, and a controller arranged to compensate the fuel supply rate based on the switch position detected at the time of switching the duct length, wherein the controller performs an action of switching to the long intake duct when the duct length switching position sensor fails and compensates the fuel supply rate using a sensor output quasi value corresponding to the time of switching to the long intake duct.

A controller for a boat propulsion unit according to a preferred embodiment of the present invention includes a switch arranged to switch between a long intake duct and a short intake duct for drawing intake air into the engine of the boat propulsion unit, a motor-operated driver arranged to drive the switch, a duct length switching position sensor arranged to detect the position of the switch at the time of switching the duct length, a fuel supply arranged to supply fuel to the engine, a failure detector arranged to detect a failure of the motor-operated driver based on the output from the duct length switching position sensor, and a controller arranged to compensate the fuel supply rate based on the switch position detected at the time of switching the duct length, wherein the controller stops energizing the motor-operated driver when the motor-operated driver fails and compensates the fuel supply rate based on the output value of the duct length switching position sensor.

A controller for a boat propulsion unit according to a preferred embodiment of the present invention includes a first intake duct disposed on one bank side of a v-type engine with a vertically disposed crankshaft of a boat propulsion unit, and a second intake duct disposed on the other bank side both for drawing intake air, a first switch arranged to switch between a long intake duct and a short intake duct provided in the first intake duct and a second switch arranged to switch between a long intake duct and a short intake duct provided in the second intake duct, a first motor-operated driver arranged to drive the first switch and a second motor-operated driver arranged to drive the second switch, a first switching position detector arranged to detect the position of the first switch when switching the duct length, a second switching position detector arranged to detect the position of the second switch when switching the duct length, and a controller arranged to drive both the first switch and the second switch when either the first switching position detector or the second switching position detector fails, and switching respectively to the long intake duct.

The controller preferably includes a failure detector arranged to compare the output of the first switching position detector with the output of the second switching position detector, with the failure detector determining the occurrence of a failure when both the output values are different for a specified period of time or longer.

The controller preferably stops energizing both the first motor-operated driver and the second motor-operated driver when either the first motor-operated driver or the second motor-operated driver fails, and compensates fuel supply rates to the cylinders of respective banks based on the respective output values of the first switching position detector and the second switching position detector.

Preferably, the reference value of the specified period of time or the reference range of a difference in the output values is changed according to the engine revolution.

The preferred embodiments of the present invention set forth above provide the following benefits and advantages.

A switchover action to the long intake duct is preferably performed when the duct length switching position sensor fails and compensation of the fuel supply rate is done using a sensor output quasi value corresponding to the time of switchover to the long intake duct. Thus, the engine performance is maintained as much as possible by reducing the compensation deviation of the fuel supply rate even in the case the duct length switching position sensor fails.

Energizing the motor-operated driver is preferably stopped when the motor-operated driver fails and the fuel supply rate is compensated according to the output value of the duct length switching position sensor at that time. Thus, the engine performance is maintained as much as possible by reducing the compensation deviation of the fuel supply rate even in the case the motor-operated driver fails.

When either of the first and second switch position sensors fails as detected by the failure detector, both the first and second switches are preferably driven to switch to the long intake ducts, so that it is possible to control both banks of cylinders in the same manner and maintain stabilized operating condition.

The output of the first switching position detector is preferably compared with the output of the second switching position detector. In a case in which both the output values are different for a specified period of time or longer, a failure is determined to have occurred. Thus, the failure determination is easily made with high accuracy.

Energizing both the first motor-operated driver and the second motor-operated driver is preferably stopped when either the first switching position detector or the second switching position detector fails, and the fuel supply rates to the respective banks of cylinders are compensated according to respective output values of the first switching position detector and the second switching position detector. Thus, it is possible to maintain both banks of cylinders in an optimum state matching the state of the respective switches and bring about a stabilized operating state of the engine even when the motor-operated driver fails.

It is also possible to determine the failure with higher accuracy by changing the reference valve of the specified period of time or the reference range of a difference in the output values according to the engine revolution.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7 is a basic fuel injection rate map.
FIGS. 8A and 8B are duct length switchover compensation coefficient maps.

DETAILED DESCRIPTION OF PREFERRED EMBODIMENTS

While a controller for a boat propulsion unit is described below with respect to preferred embodiments of the present invention, the present invention is not limited to the preferred embodiments described below.

Figure 1:
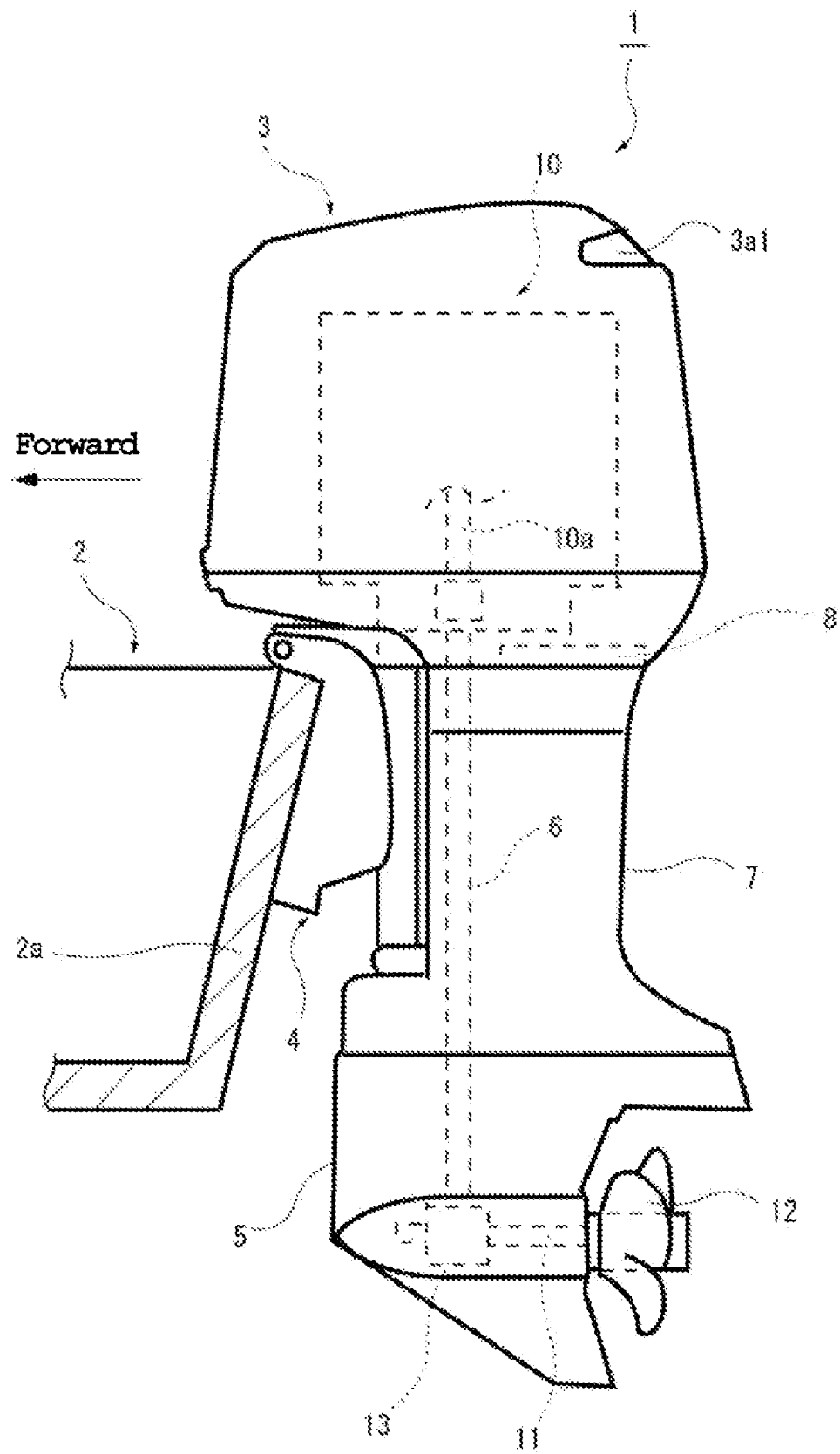
FIG. 1 is a side view of a boat propulsion unit.
Figure 2:
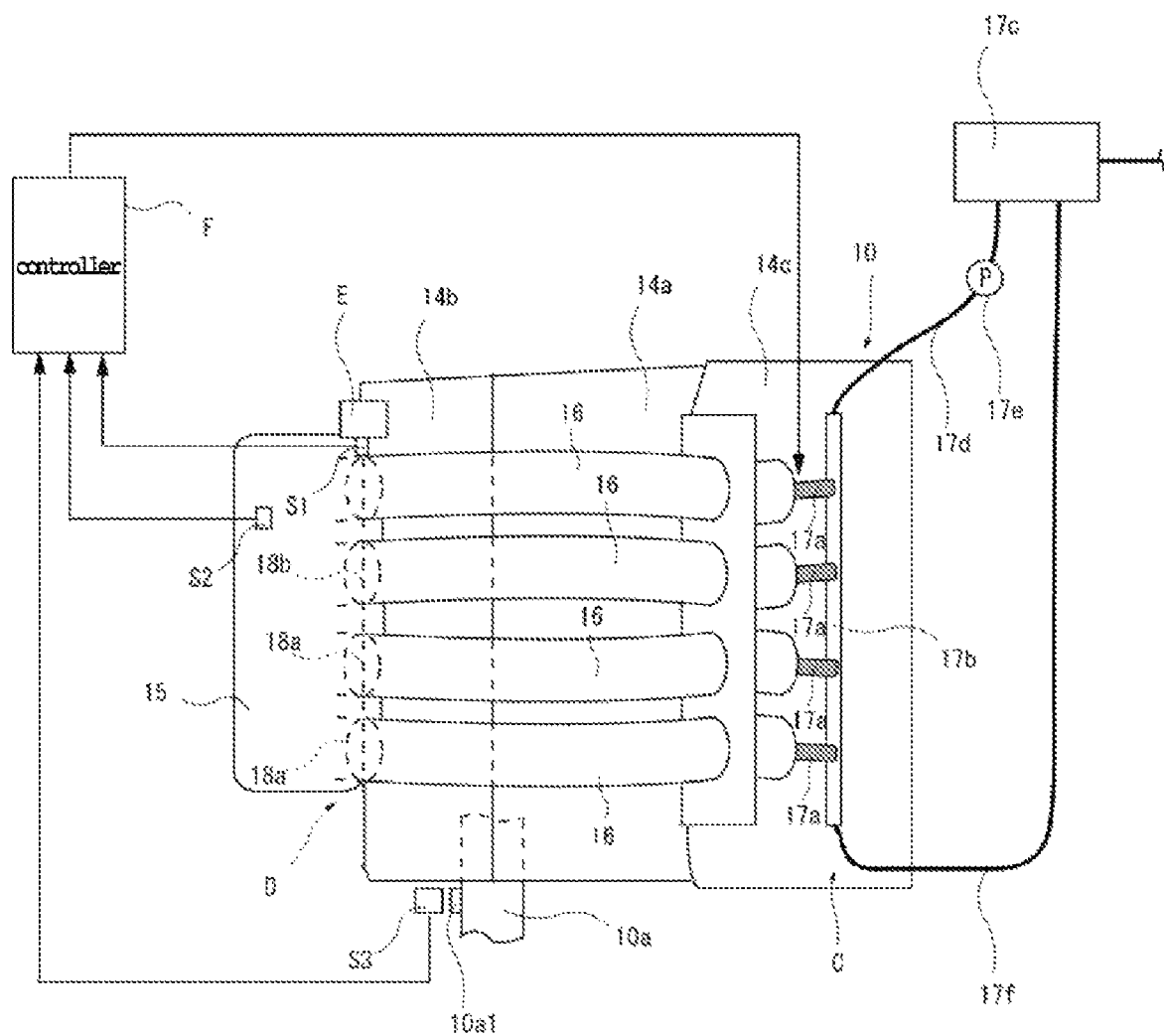
FIG. 2 shows a duct length switchover structure.
Figure 3:
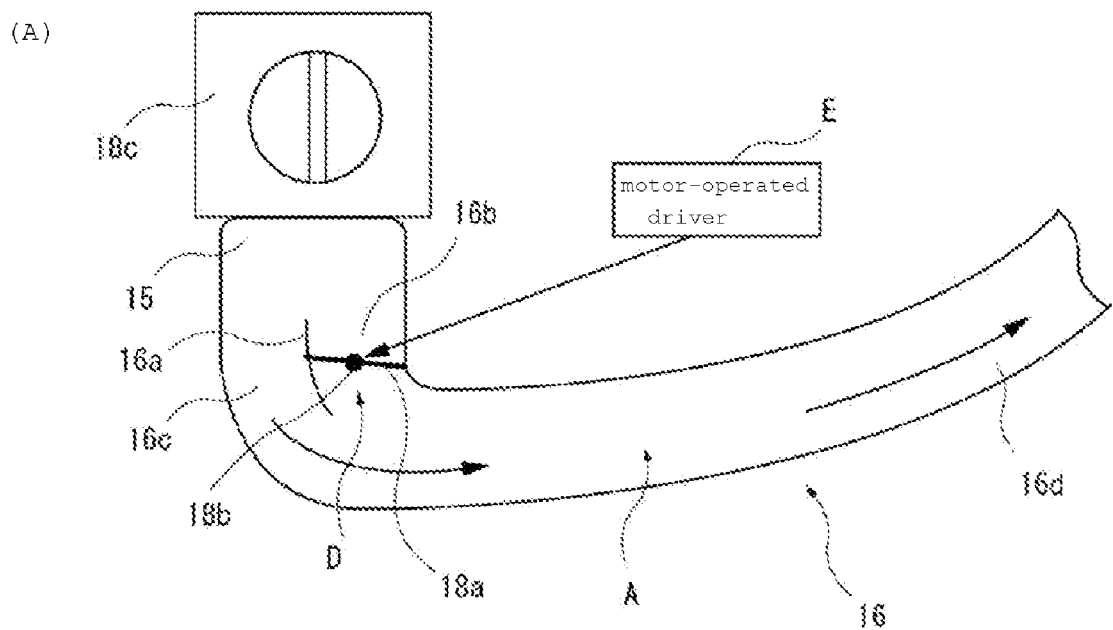
FIGS. 3A and 3B explain the duct length switchover.
Figure 3:
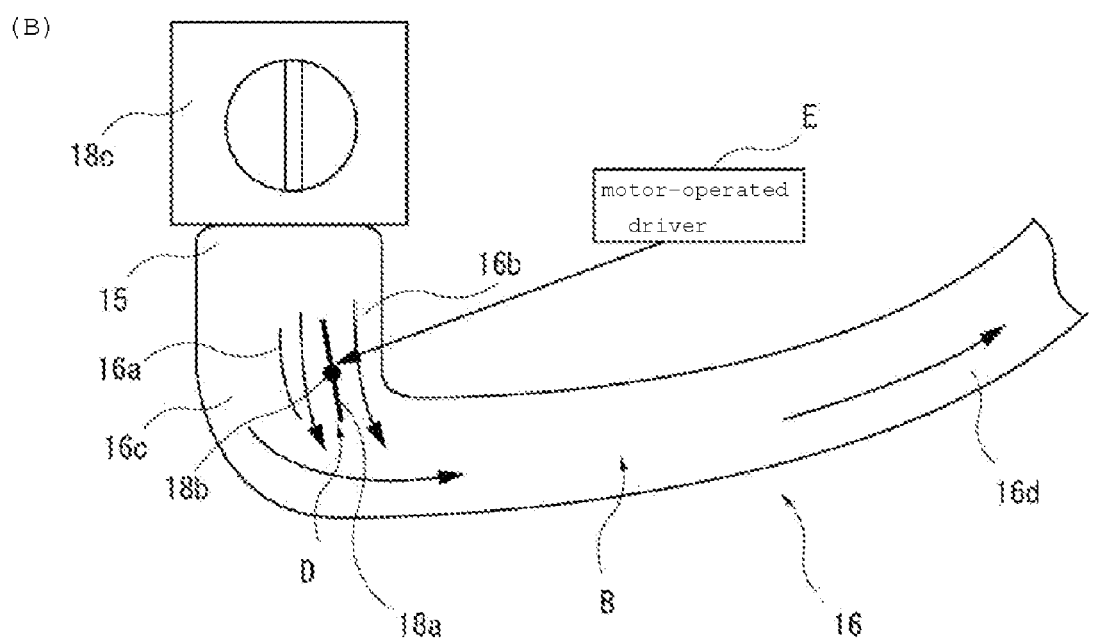
Figure 4:
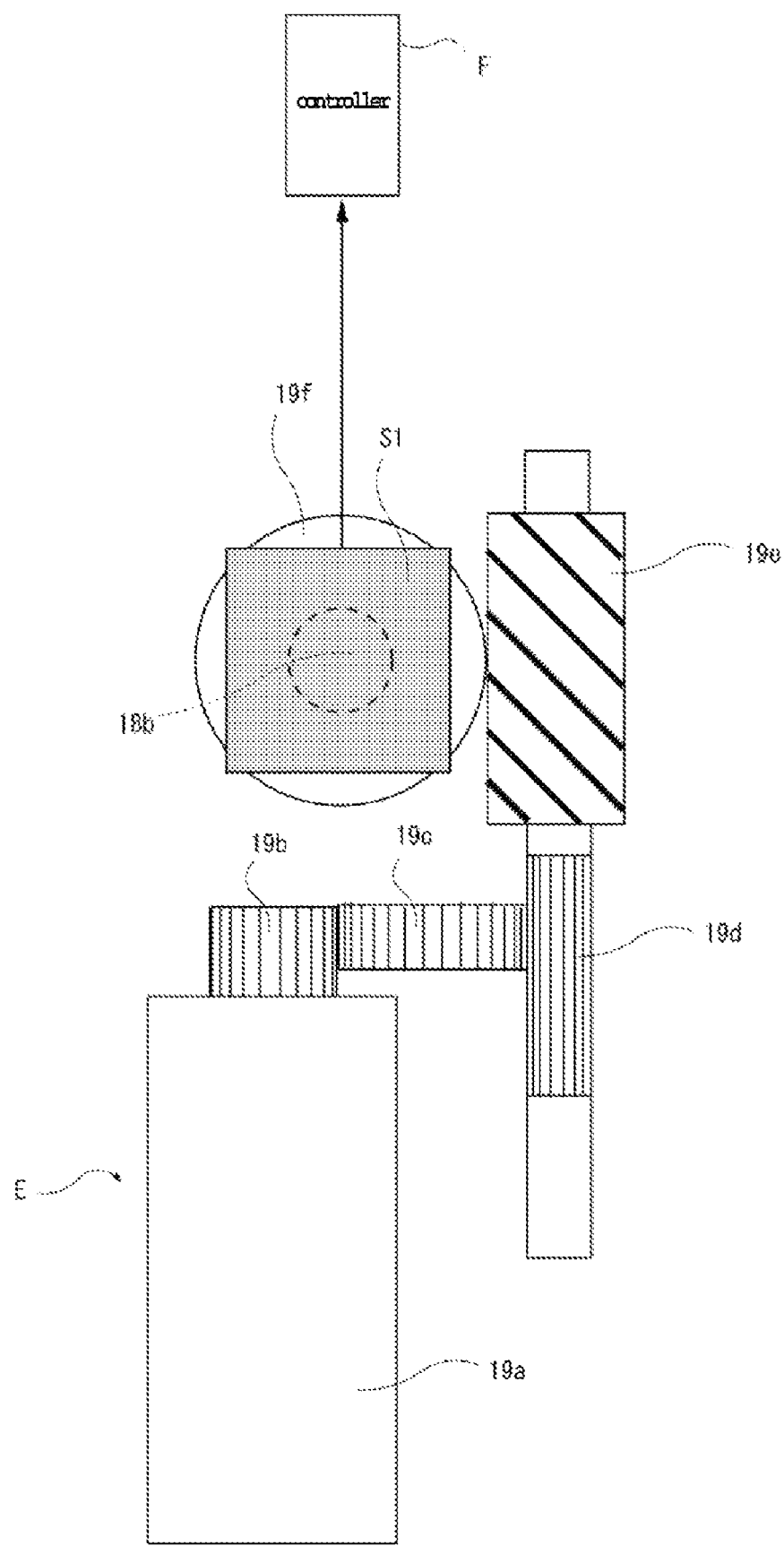
FIG. 4 shows a duct length switchover mechanism.

FIGS. 1 through 4 show an engine with parallel cylinders and a vertical crankshaft in which a boat propulsion unit controller according to a preferred embodiment of the present invention is installed. FIG. 1 is a side view of the boat propulsion unit. FIG. 2 shows a duct length switchover structure. FIG. 3 explains the duct length switchover. FIG. 4 explains the duct length switchover mechanism. The terms front, rear, left, and right as used herein are meant as looking forward from behind the boat.

In the figures, an outboard motor 1 as a preferred embodiment of a boat propulsion unit is supported for vertical and lateral swinging by a clamp bracket 4 secured to the stern 2a of a hull 2. The boat propulsion unit 1 includes a lower case 5 on which an upper case 7 is placed through which a driveshaft 6 passes. An engine 10 is mounted through an exhaust guide 8 on the upper case 7 and is surrounded in a watertight manner with a cowling 3. The upper portion of the rear wall of the cowling 3 is provided with an external air guiding hole 3a1 for drawing external air into the cowling 3.

In the boat propulsion unit 1, a screw 12 is attached to the rear end of an approximately horizontally propeller shaft 11. The front end of the propeller shaft 11 is connected through a bevel gear mechanism 13 to the lower end of the driveshaft 6. The bevel gear mechanism 13 may be shifted for either forward or reverse motion by a forward-reverse shifting mechanism (not shown).

The engine 10 is preferably a water-cooled, four-stroke cycle, parallel four-cylinder engine, with a crankshaft 10a disposed vertically so as to be approximately vertical when the boat runs. The driveshaft 6 is connected to the lower end of the crankshaft 10a. The engine 10 as shown in FIG. 2 preferably includes a cylinder block 14a, a crankcase 14b, and a cylinder head 14c. Pistons (not shown) are inserted for sliding within the cylinders. The pistons are connected through connecting rods to the crankshaft 10a so as to drive the crankshaft 10a.

A surge tank 15 is located on the front side of the engine 10. Four intake manifold branches 16 arranged in a vertical row on the left side of the engine 10 are connected to the surge tank 15. The intake manifold branches 16 extend nearly horizontally toward and connect to the cylinder head 14c to supply a fuel-air mixture to combustion chambers (not shown) of the engine 10.

Each intake manifold branch 16 is provided with an independent fuel injection valve 17a as a fuel supply C for supplying fuel to each cylinder of the engine 10. The respective fuel injection valves 17a are connected to a fuel supply rail 17b placed parallel to the crankshaft 10a. The fuel supply rail 17b is connected to a fuel supply hose 17d which is then connected to a vapor separator tank 17c. Fuel in the vapor separator tank 17c is pressurized by the drive of a high pressure pump 17e and sent under pressure to the fuel supply rail 17b. Surplus fuel is returned through a hose 17f to the vapor separator tank 17c.

As shown in FIG. 3, a throttle valve 18c is connected to the upstream side of the surge tank 15. A passage divider 16a is provided in the upstream portion of the interior of each intake manifold branch 16 to divide the interior into a first passage 16b and a second passage 16c. The first and second passages 16b and 16c are joined together on their downstream side to define a joint passage 16d. A duct length switching valve 18a as a switch D that turns to open and close the first passage 16b is provided in the position of the passage divider 16a. The duct length switching valve 18a may be replaced for example with another duct length switching valve 18a that slides to open and close the first passage 16b, or any other suitable switch or valve.

A motor-operated driver E based on the engine revolution drives the switch D, more specifically the duct length switching valve 18a. When the engine revolution is low or the engine is in low speed operation, as shown in FIG. 3A, the duct length switching valve 18a fully closes the first passage 16b, so that air flows through the second passage 16c to the downstream joint passage 16d or a long intake duct A, and into the engine 10.

On the other hand, when the engine revolution is high or the engine is in high speed operation, as shown in FIG. 3B, the duct length switching valve 18a fully opens the first passage 16b so that air flows through both the first and the second passages 16b and 16c to the downstream joint passage 16d or a short intake duct B, and into the engine 10.

An actuator as the motor-operated driver E is arranged as shown in FIG. 4. In the actuator, a driving motor 19a drives a pinion gear 19b which in turn drives a drive shaft 19d through a reduction gear 19c. By the rotation of the drive shaft 19d, a driven gear 19f is rotated through a worm gear 19e. The driven gear 19f is provided on the upper portion of a vertically disposed valve shaft 18b. As the valve shaft 18b rotates, the duct length switching valve 18a is opened or closed. The duct length switching valve 18a of the present preferred embodiment is preferably a butterfly type as shown in FIG. 2, with respective valve vanes connected to the single valve shaft 18b extending in the direction of the crankshaft 10a. The valve shaft 18b is also provided with a duct length switching position sensor S1. A turning angle sensor is preferably used as the duct length switching position sensor S1 to send a sensor output or a voltage signal corresponding to the turning angle of the valve shaft 18b to a controller F.

An intake pressure sensor S2 is provided as shown in FIG. 2 in the intake system including the surge tank 15, etc., so as to detect the pressure of air flowing through the intake system and send a voltage signal to the controller F. Further as shown in FIG. 2, a crankshaft sensor S3 is arranged to face a projection 10a1 provided on the crankshaft 10a. The crankshaft sensor S3 senses the projection 10a1 to output pulse signals corresponding to the engine revolution and sends the output pulse signals to the controller F.

Figure 5:
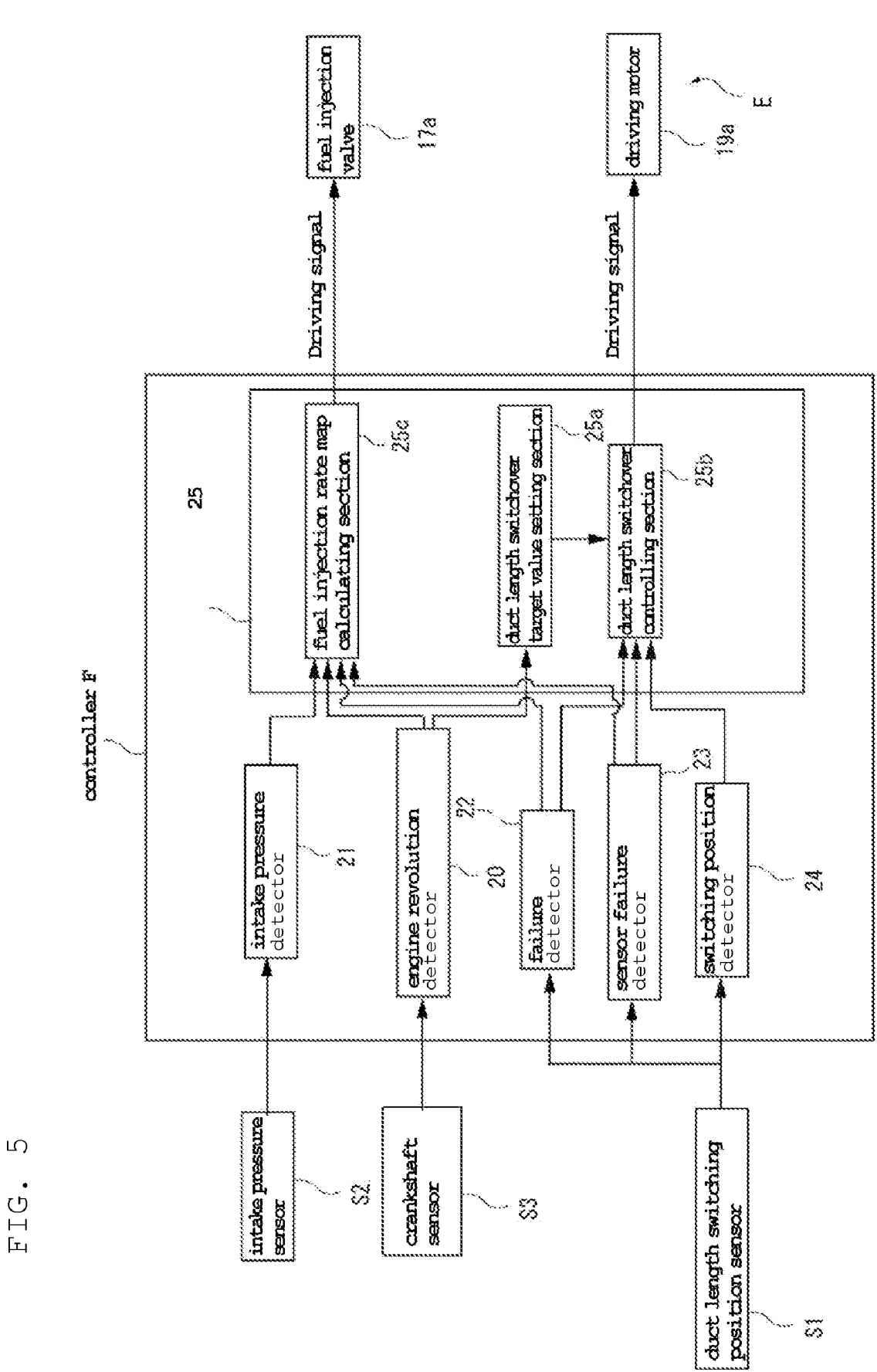
FIG. 5 is a general block diagram of a controller.
Figure 6:
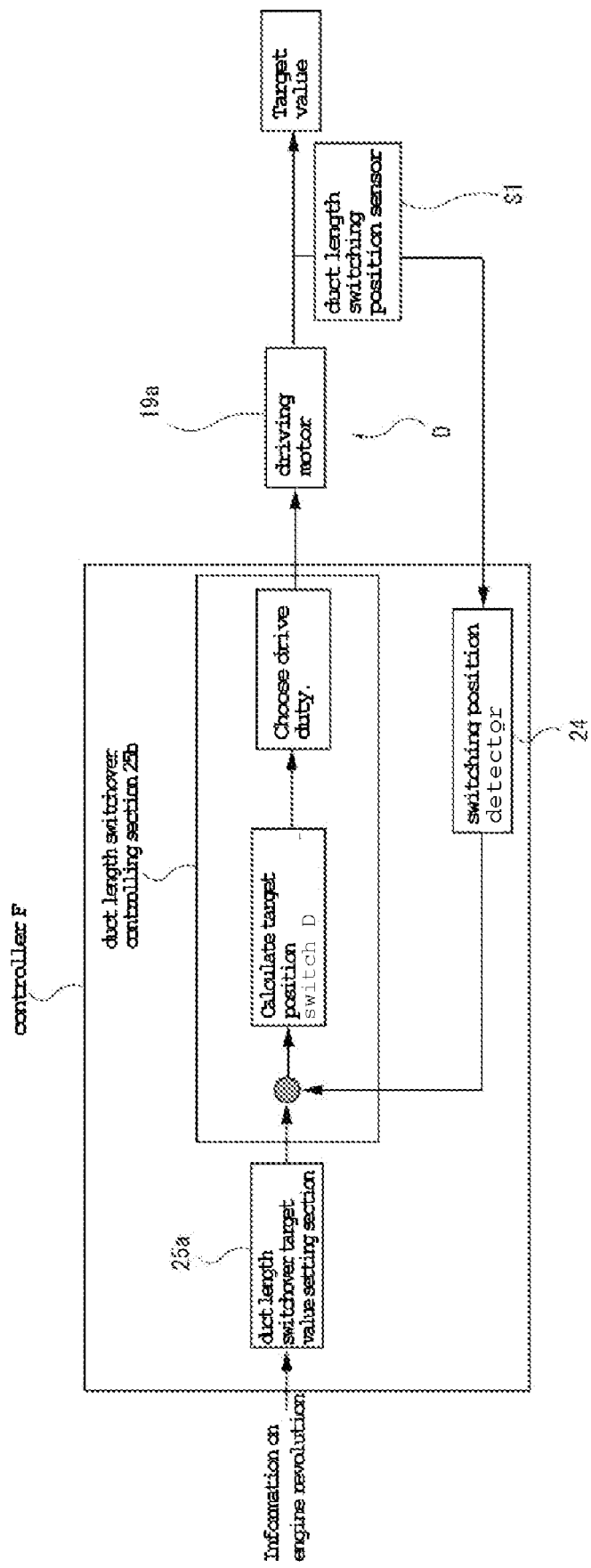
FIG. 6 is a block diagram of controlling the duct length switchover action.
Figure 9:
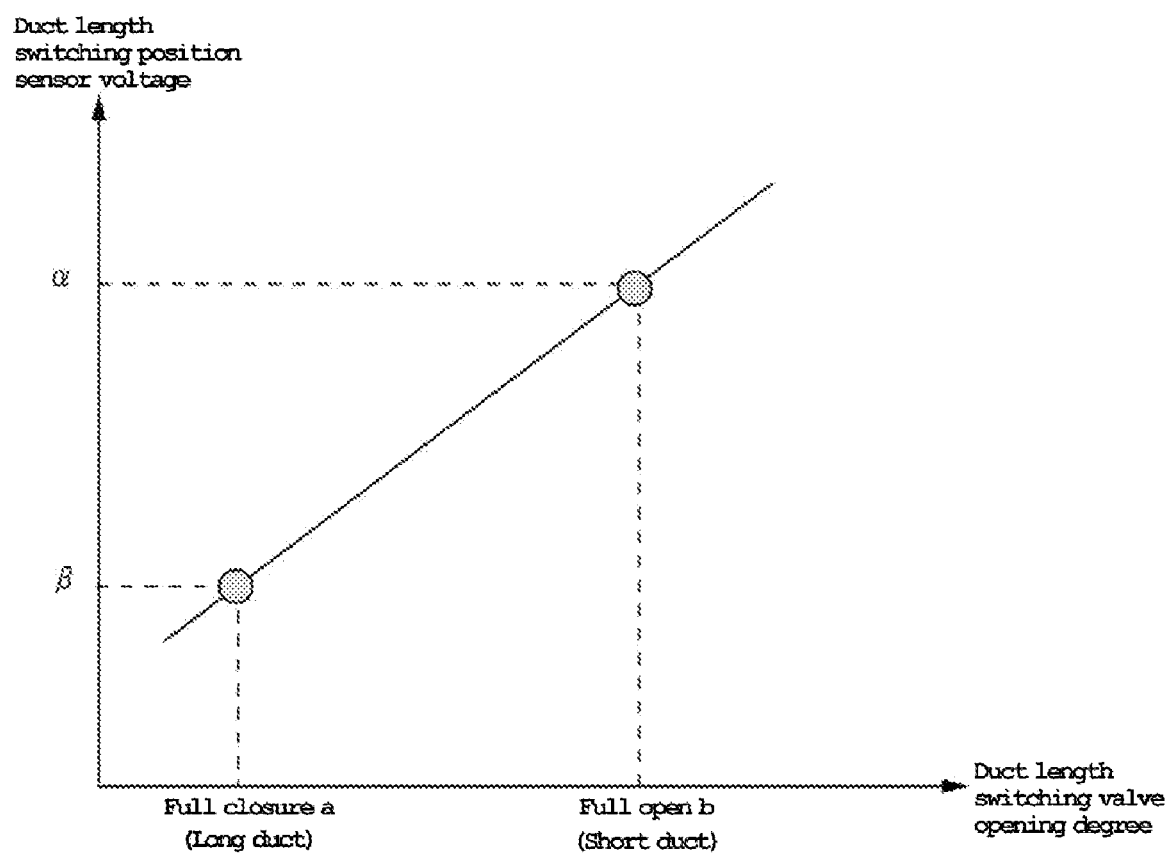
FIG. 9 shows the characteristics of the duct length switching position sensor.
Figure 10:
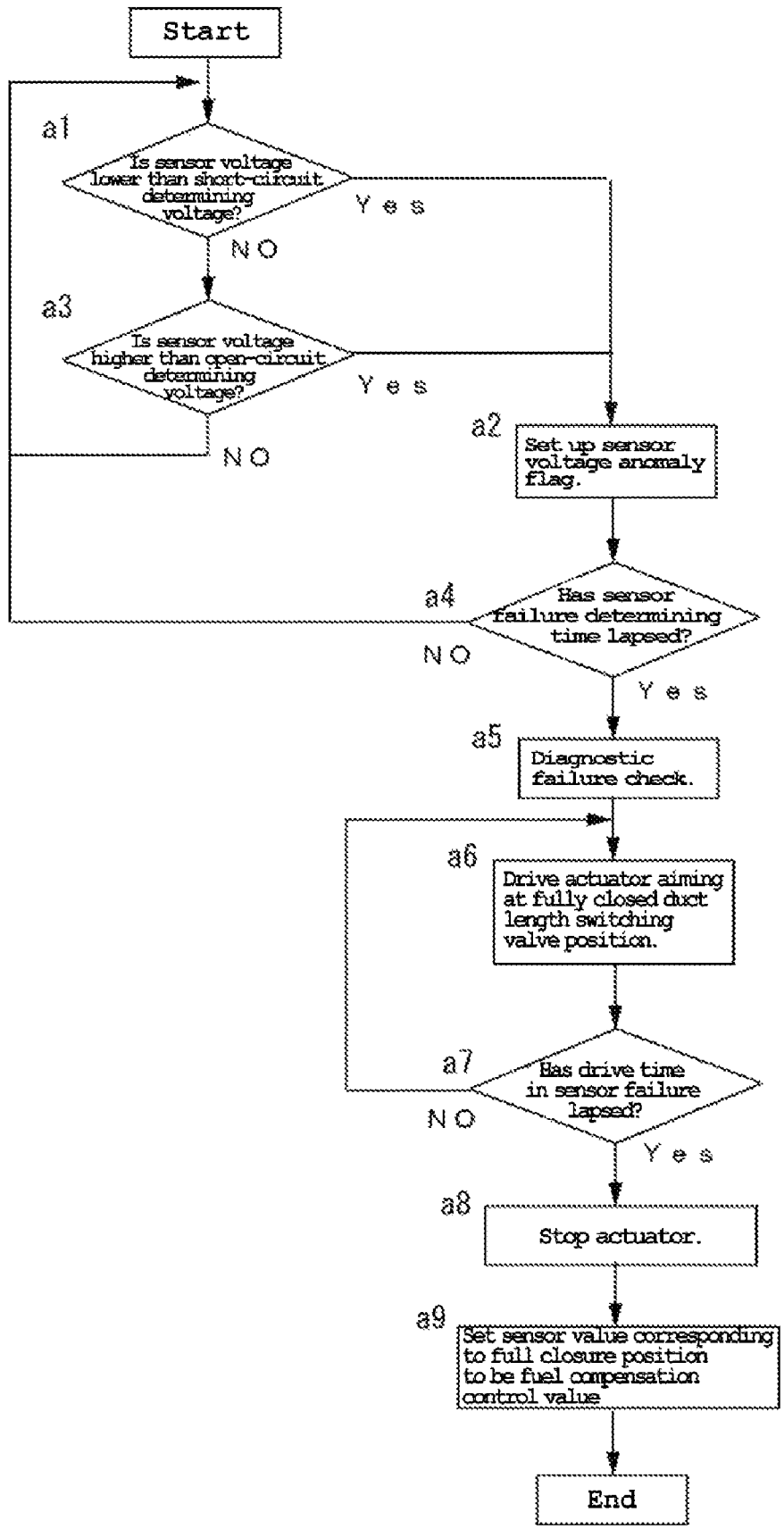
FIG. 10 is a flowchart of a control process when the sensor fails.
Figure 11:
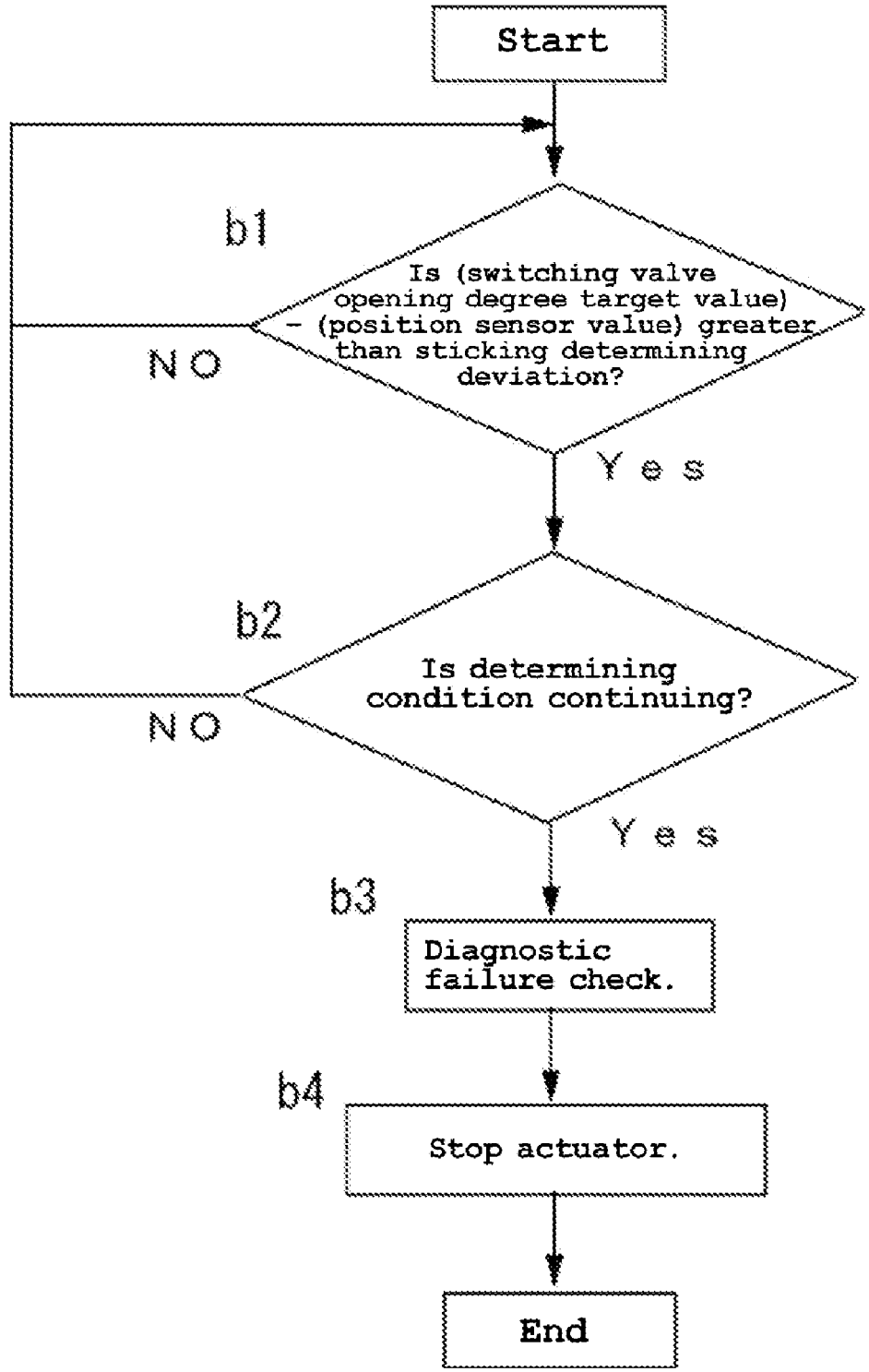
FIG. 11 is a flowchart of controlling drive failure.

Next, the controller F of the boat propulsion unit is described with respect to FIGS. 5 through 11. FIG. 5 is a general block diagram of the controller. FIG. 6 is a block diagram of actions of controlling the duct length switchover. FIG. 7 is a basic fuel injection rate map. FIGS. 8A and 8B are duct length switchover compensation coefficient maps. FIG. 9 shows the characteristic of the duct length switching position sensor. FIG. 10 is a flowchart of a control process when the sensor fails. FIG. 11 is a flowchart of controlling a drive failure.

The controller F as shown in FIG. 5 preferably includes an engine revolution detector 20, an intake pressure detector 21, a failure detector 22, a sensor failure detector 23, a switching position detector 24, and a controller 25. The controller 25 preferably includes a duct length switchover target value setting section 25a, a duct length switchover controlling section 25b, and a fuel injection rate map calculating section 25c.

The engine revolution detector 20 detects the engine revolution in proportion to the pulse signals from the crankshaft sensor S3 and outputs the information concerning the engine revolution to the duct length switchover target value setting section 25a and to the fuel injection rate map calculating section 25c.

The intake pressure detector 21 detects an intake pressure using the voltage signal from the intake pressure sensor S2 and sends the information concerning the intake pressure to the fuel injection rate map calculating section 25c.

The failure detector 22 detects a failure in the motor-operated driver E using the sensor output from the duct length switching position sensor S1 and sends the failure information to the duct length switchover controlling section 25b and to the fuel injection rate map calculating section 25c. The failure in the motor-operated driver E is determined to have occurred when, for example, the absolute value of a deviation of an actual position value from a target position value is greater than a deviation value for determining that the driving motor 19a is stuck and the state continues for a specified period of time, preferably for a period measured in ms.

The sensor failure detector 23 detects a failure in the duct length switching position sensor S1 based on the output signal from the sensor which has become inoperative due to a short circuit or broken wire, for example, and sends the sensor failure information to the duct length switchover controlling section 25b and to the fuel injection rate map calculating section 25c. The failure in the duct length switching position sensor S1 is determined to have occurred due to a short circuit or broken wire when, for example, the input voltage value of the sensor signal remains smaller than a lower limit voltage value or greater than an upper limit voltage value over a specified period of time (in ms).

The switching position detector 24 detects, when the duct length is changed, the position of the switch D using a voltage signal output corresponding to the turning angle of the valve shaft 18b from the duct length switching position sensor S1, and sends the switching position information to the duct length switchover controlling section 25b.

Next, the duct length switchover action control by the duct length switchover target value setting section 25a and the duct length switchover controlling section 25b is described with respect to FIG. 6, which is a block diagram of the duct length switchover action control.

The duct length switchover target value setting section 25a receives an input of the engine revolution and calculates the target position of the switch D using the engine revolution information.

The duct length switchover controlling section 25b compares the target position calculated in the duct length switchover target value setting section 25a with the position of the switch D detected at the time of duct length switchover with the switching position detector 24, and calculates the difference between the calculated target position and the actually fed back position of the switch D. A drive duty of the driving motor 19a is chosen from the position difference. A driving signal based on the chosen drive duty is outputted to drive the driving motor 19a. As the driving motor 19a is driven, the switch D is brought to the target position.

The duct length switchover controlling section 25b, as it receives a sensor failure information from the sensor failure detector 23, drives the driving motor 19a so as to switch the duct length switching valve 18a to the calculated target position or to full closure to define the long intake duct A when the sensor is faulty.

Also, the duct length switchover controlling section 25b, as it receives a failure information from the failure detector 22, stops operating the driving motor 19a.

Next, fuel supply control by the fuel injection rate map calculating section 25c is described according to FIGS. 7 through 9.

The fuel injection rate map calculating section 25c receives information concerning the engine revolution, intake pressure, switching position, failure detected by the failure detector 22, and sensor failure detected by the sensor failure detector 23; calculates a basic fuel injection rate using the basic fuel injection rate map shown in FIG. 7 according to the information concerning the engine revolution and the intake pressure; and outputs a driving signal corresponding to the basic fuel injection rate to the respective fuel injection valves 17a. As a result, the fuel injection valves 17a are controlled to deliver fuel at the calculated basic injection rate through the fuel injection valves 17a.

When switchover between the short intake duct B and the long intake duct A is performed, the fuel injection rate map calculating section 25c compensates the basic fuel injection rate according to the switching position information. The compensated fuel injection rate is preferably determined by calculation of the basic fuel injection rate map value multiplied by the duct length switchover compensation value. The basic fuel injection rate map value may be obtained from the map of FIG. 7 in which the vertical axis plots engine revolution and the horizontal axis plots intake pressure. The basic fuel injection rate map value increases with the increase in engine revolution and intake pressure.

The duct length switchover compensation value is preferably determined by calculation of the long duct compensation map value multiplied by a coefficient plus the short duct compensation map value multiplied by (1 minus a coefficient). The long duct compensation map value may be obtained from the map of FIG. 8A in which the vertical axis plots engine revolution and the horizontal axis plots intake pressure. The compensation fuel injection rate map value increases with the increase in engine revolution and intake pressure. The short duct compensation map value may be obtained from the map of FIG. 8B in which the vertical axis plots engine revolution and the horizontal axis plots intake pressure. The compensation fuel injection rate map value increases with the increase in engine revolution and intake pressure.

The coefficients may be obtained from the characteristic of the duct length switching position sensor shown in FIG. 9, with its horizontal axis plotting the duct length switching position (valve opening degree) and the vertical axis plotting the duct length switching position sensor voltage. The duct length switching position sensor voltage increases in proportion to the movement of the valve from full closure (a) to full open (b). When the duct length switching position is at the full closure (a), air is drawn in through the long intake duct A shown in FIG. 3A, with the duct length switching position sensor voltage being β; and when the duct length switching position is at the full open (b), air is drawn in through the short intake duct B shown in FIG. 3B, with the duct length switching position sensor voltage being α. The coefficient is assumed to be "0" when the duct length switching position is at full closure (a) and the duct length switching position sensor value is β; and to be "1" when the duct length switching position is full open (b) and the duct length switching position sensor value is α.

The coefficients for positions between full closure (a) and full open (b) are calculated by (duct length switching position sensor voltage minus β) divided by (α minus β). As a result, when the duct length switching position is near the long intake duct of full closure (a), the coefficient approaches "1," and the duct length switchover compensation value is calculated with the equation with weight on the long duct compensation map value. In contrast, when the duct length switching position is near the short intake duct of full open position (b), the coefficient approaches "0," and the equation for calculating the compensation value is weighted on the short duct compensation map value.

In this way, while the engine of the boat propulsion unit 1 is often operated at a high load, high revolution range and the duct length is frequently switched when the boat is running, compensating the fuel supply rate according to the switch position detected at the time of duct length switchover makes it possible to compensate the fuel supply rate even during the switchover and obtain optimum air-to-fuel ratio.

When the duct length switching position sensor S1 fails, the sensor failure detector 23 outputs sensor failure information to the duct length switchover controlling section 25b. The duct length switchover controlling section 25b changes the duct to the long intake duct B and then compensates the fuel supply rate using a preset output quasi value corresponding to the time of switchover to the long intake duct. In this way, when the duct length switching position sensor S1 fails, the controller 25 performs the action of switchover to the long intake duct and compensates the fuel supply rate using the preset output quasi value corresponding to the time of switchover to the long intake duct. Thus, it is possible, even when the duct length switching position sensor S1 fails, to maintain engine performance while reducing the fuel supply rate compensation deviation. The control when the duct length switching position sensor S1 fails will be described according to FIG. 10, which is a control flowchart of when the sensor fails.

In step a1, a determination is made if the sensor voltage of the duct length switching position sensor S1 is below a lower limit voltage for determining a short circuit. If the voltage is below the lower limit, the process goes to step a2; and if not, to step a3.

In step a2, a sensor voltage anomaly flag is set up.

In step a3, a determination is made if the sensor voltage of the duct length switching position sensor S1 is higher than an upper limit voltage for determining an open circuit. If it is not higher, the process goes to step a1; and if it is higher, to step a2.

In step a4, it is determined if a specified period of time (in ms) for determining the failure of the sensor has lapsed. If it has not lapsed, the process goes to step a1; and if it has lapsed, to step a5.

In step a5, a diagnostic failure check is performed.

In step a6, the actuator driving motor 19a is operated to operate the duct length switch 18a, or the switch D, targeted at the full closure position.

In step a7, it is determined if a driving duration for failure determination has lapsed. If it has not lapsed, the process goes to step a6; and if it has lapsed, to step a8.

In step a8, operation of the actuator driving motor 19a is stopped.

In step a9, the output value of the duct length switching position sensor S1 corresponding to the full closure position of the duct length switching valve 18a or the switch D is set to the fuel compensation control value.

In this way, the actuator driving motor 19a is operated in the full closure direction to move back the duct length switching valve 18a. After that, the output quasi value corresponding to the time of switchover to the long duct corresponding to full closure is used for the fuel compensation control.

In the present preferred embodiment, when the duct length switching position sensor S1 fails, as the position of the switch D becomes unknown, fuel compensation cannot be performed. However, the actuator is operated to switch the duct to the long intake duct A. Doing so makes it possible to compensate the preset fuel supply rate using the output quasi value corresponding to the time of switching to the long intake duct, and maintain as much as possible the engine performance even when the duct length switching position sensor S1 fails.

When the motor-operated driver E fails, the duct length switchover controlling section 25b stops energizing the motor-operated driver E and compensates the fuel supply rate based on the sensor output value at that time. Thus, it is possible to minimize the fuel supply rate compensation deviation even when the motor-operated driver E fails and maintain the engine performance as much as possible. The control when the motor-operated driver fails will be described according to the control flowchart in FIG. 11 for the time of the failure.

In step b1, a determination is made if the value obtained by subtracting the "value detected with the duct length switching position sensor S1" from the position (opening degree) of the duct length switching valve, or the switch D, is greater than a deviation for determining if the motor is stuck. If it is not greater, the determination is repeated; and if it is greater, the process goes to step b2.

In step b2, a determination is made if the condition for determining the occurrence of the motor being stuck has continued longer than the limit time. If it has not continued, the process goes to step b1; and if it has continued, to step b3.

In step b3, a diagnostic failure check is performed.

In step b4, operation of the actuator driving motor 19a is stopped.

In this way, the switch D or the duct length switching valve 18a remains in the failed position. However, as the sensor remains effective and the fuel compensation control is performed according to the current valve position, the engine performance is maintained as much as possible.

In the present preferred embodiment, when the motor-operated driver E fails, the switch D is disabled and the fuel supply rate is compensated according to the position of the switch D at the time of the failure. Therefore, it is possible to provide fuel compensation matching the position of the switch D at the time of the failure even when the duct length switchover between the long intake duct B and the short intake duct A fails while the boat is running. Thus, the engine performance may be maintained as much as possible.

Figure 12:
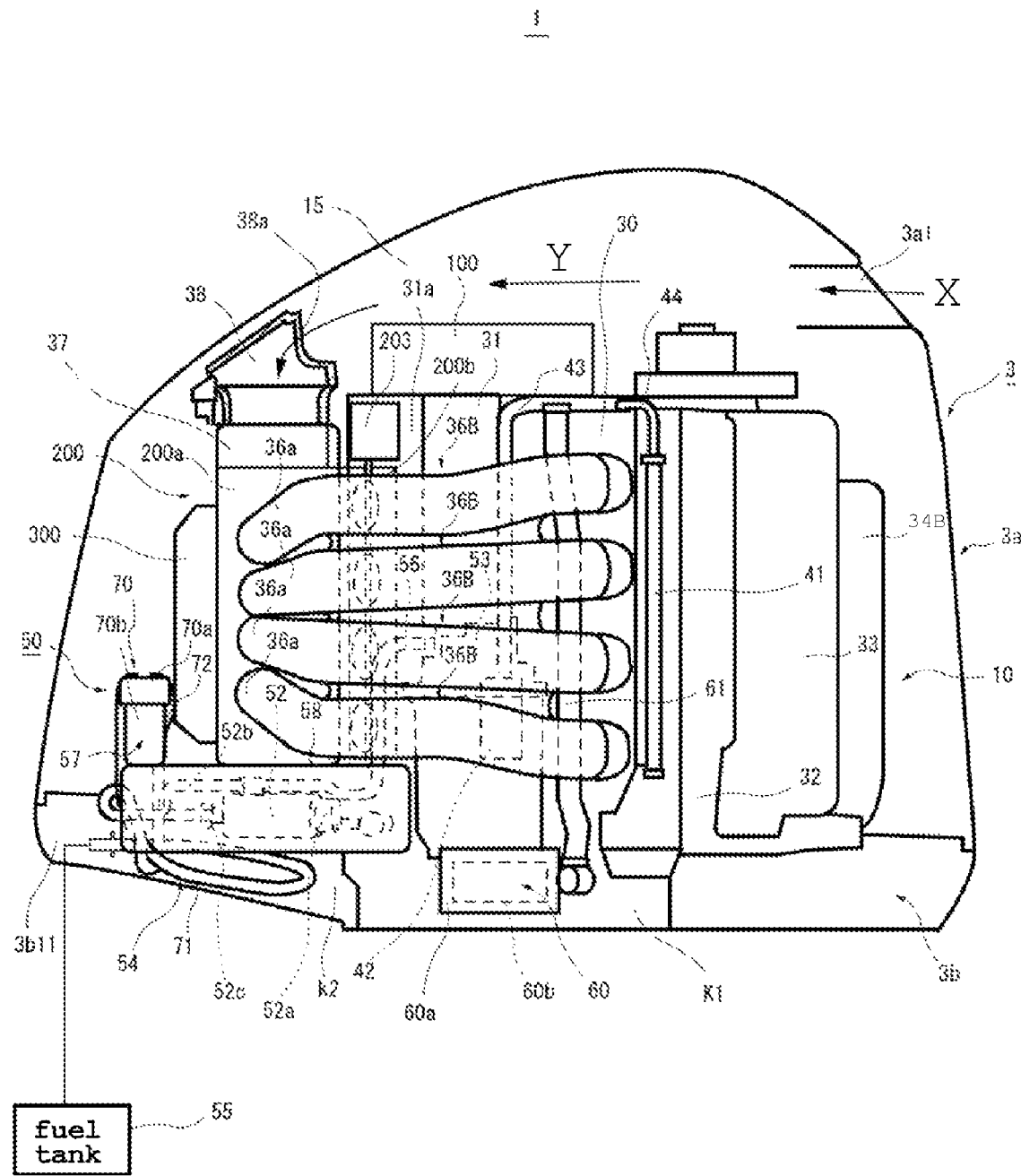
FIG. 12 is a side view of the engine layout.
Figure 13:
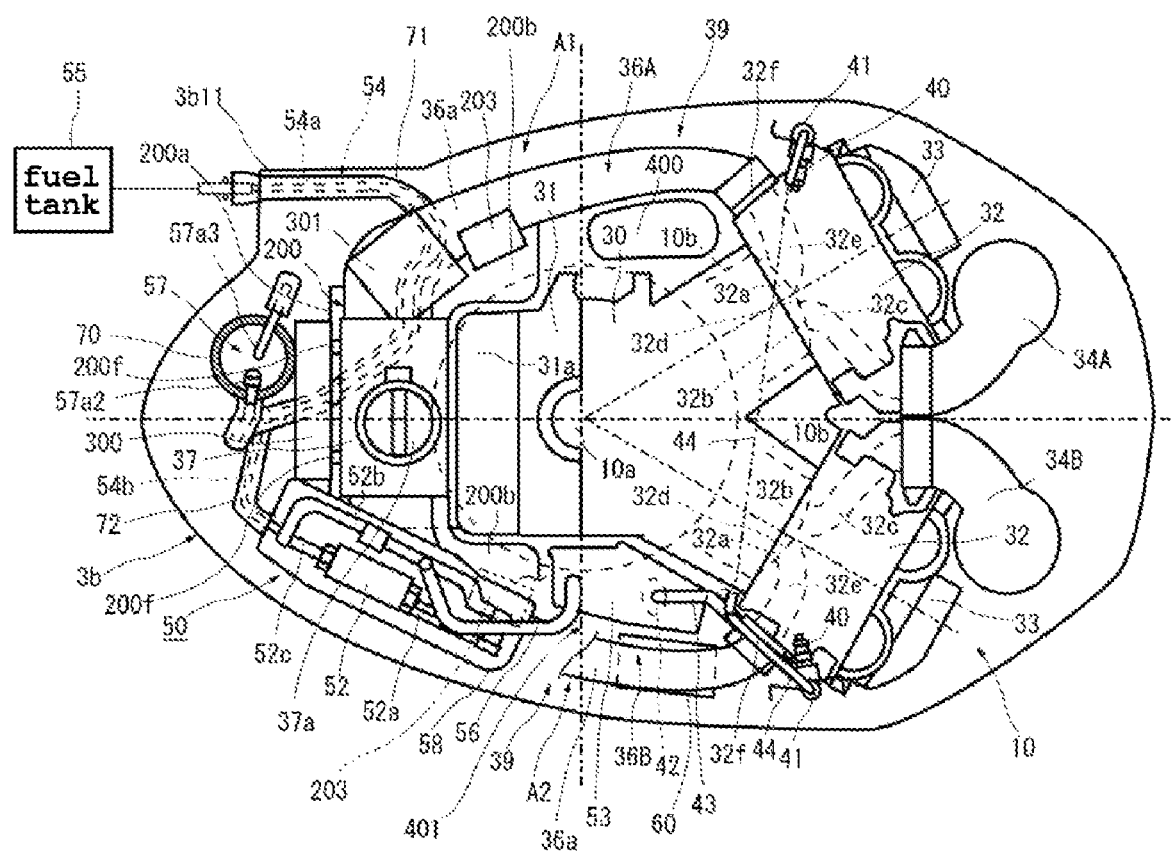
FIG. 13 is a plan view of the engine layout.
Figure 14:
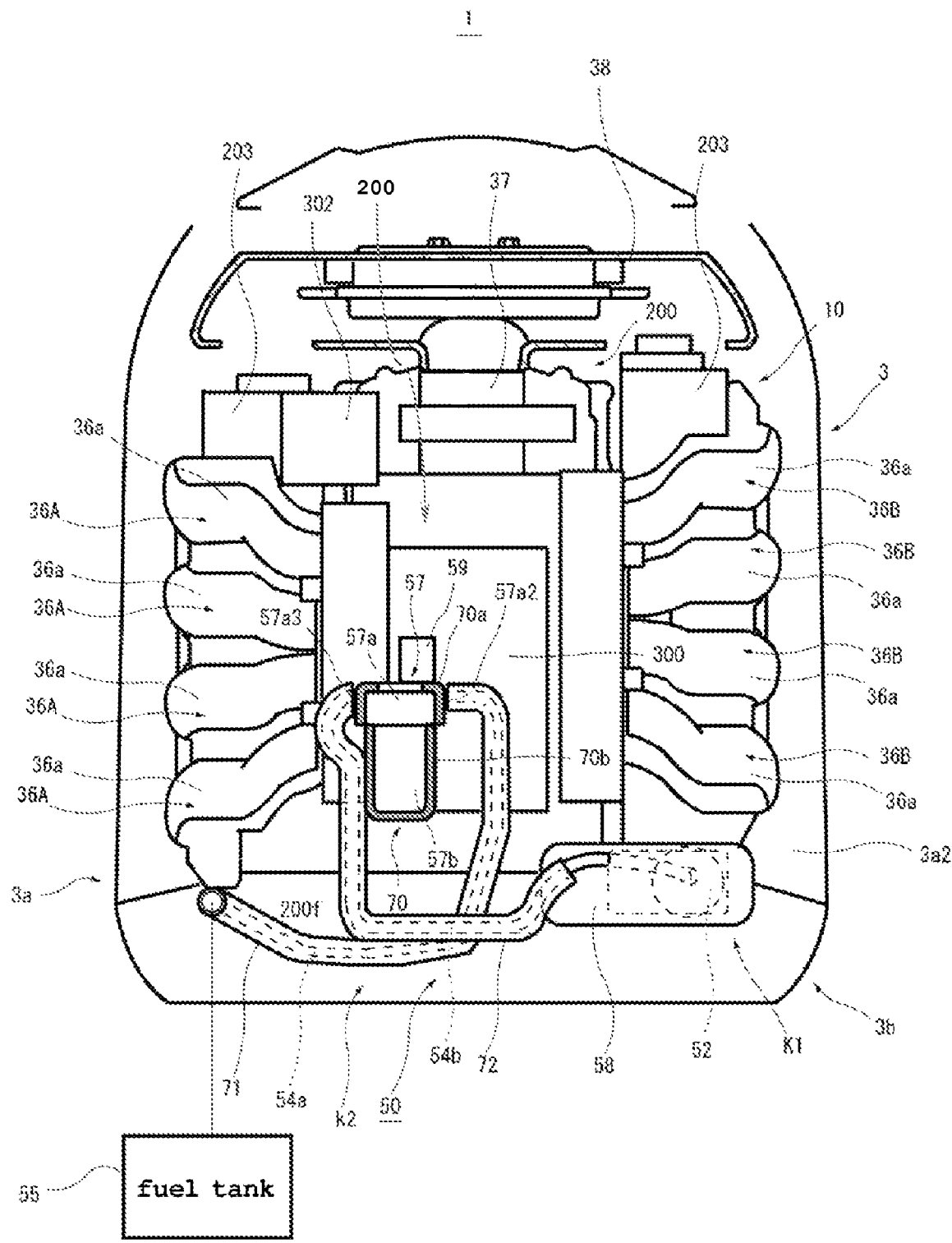
FIG. 14 is a front view of the engine layout.
Figure 15:
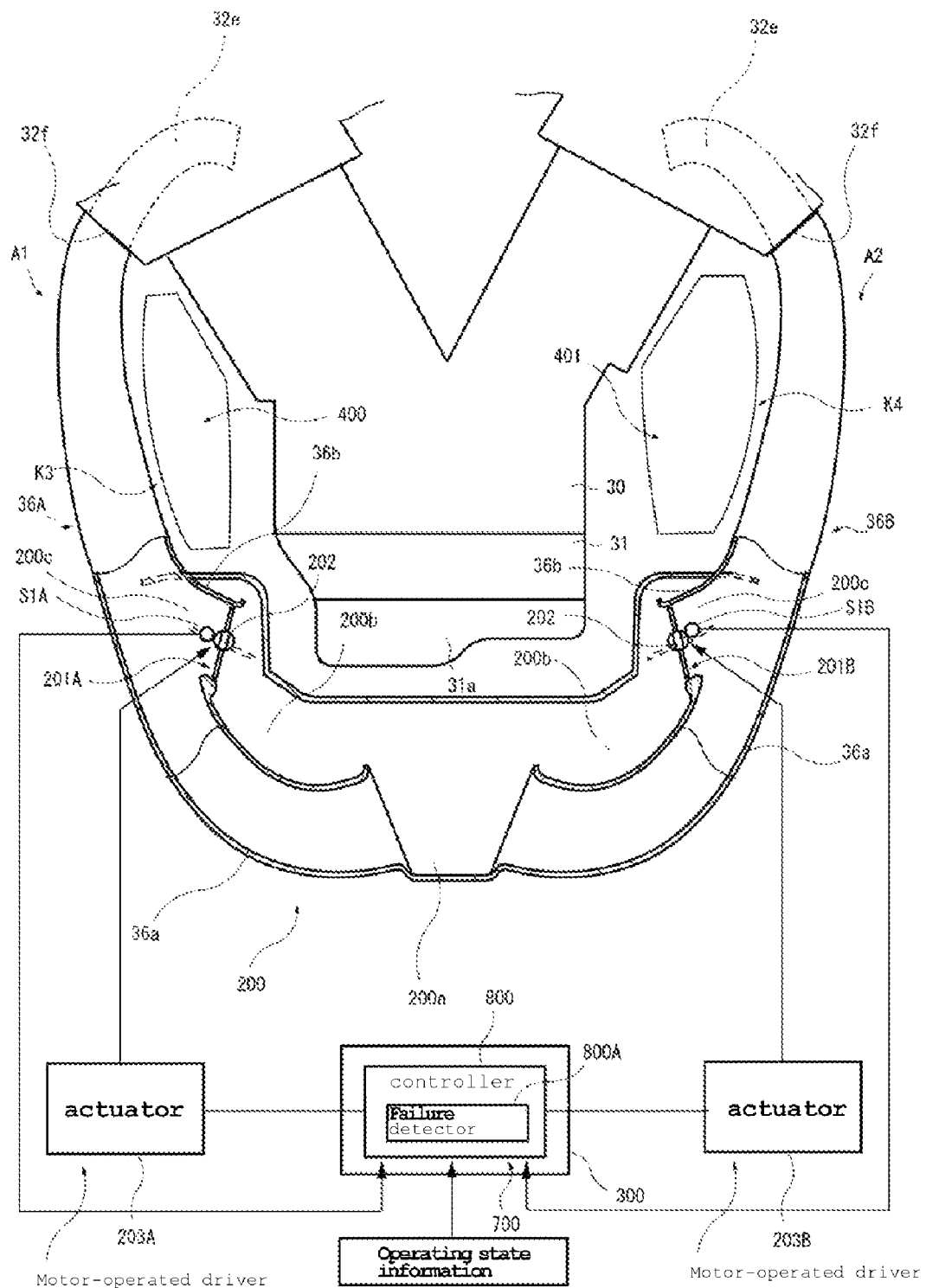
FIG. 15 shows a cross section of an intake structure.
Figure 16:
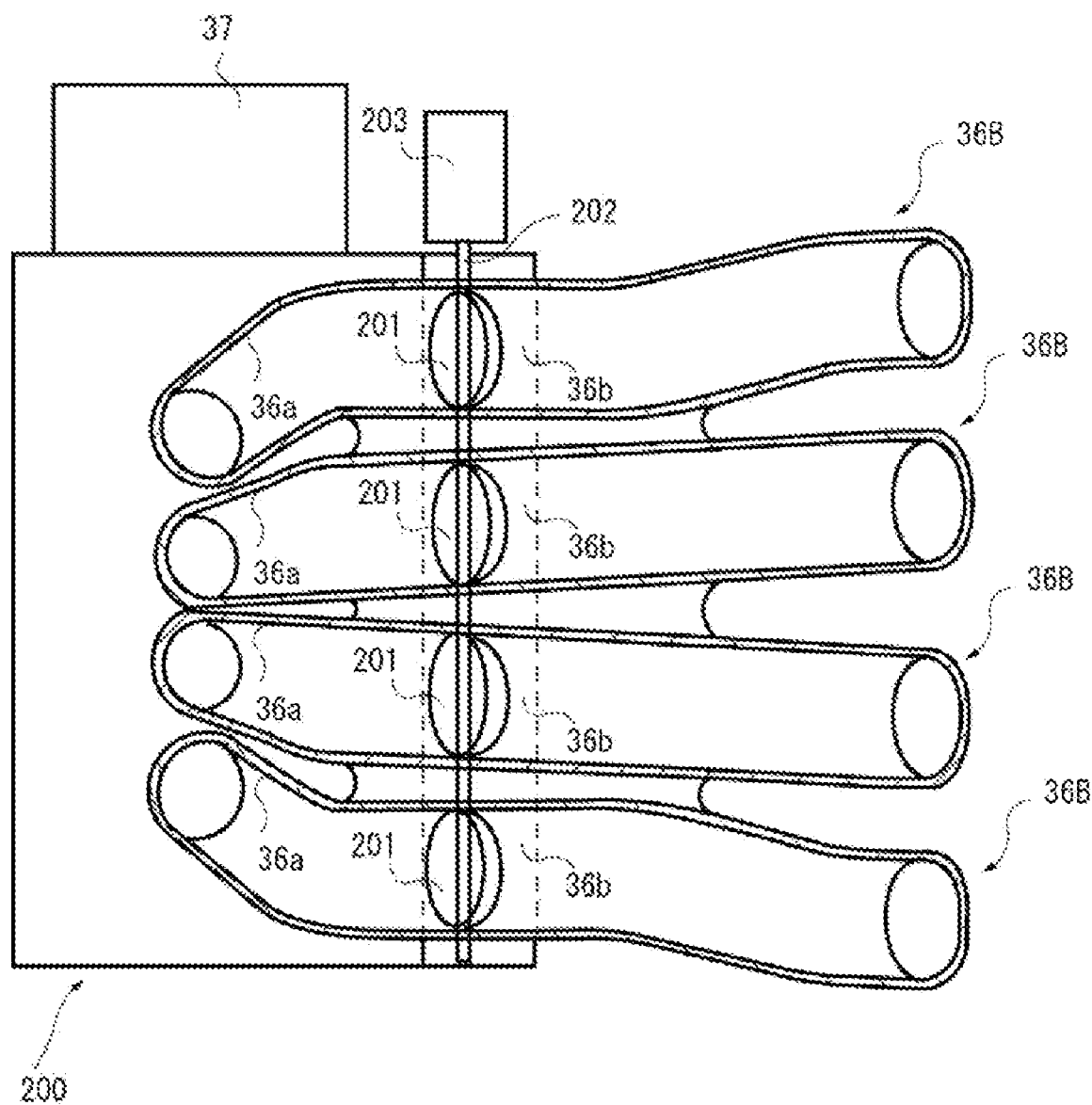
FIG. 16 shows a vertical section of the intake structure.
Figure 17:
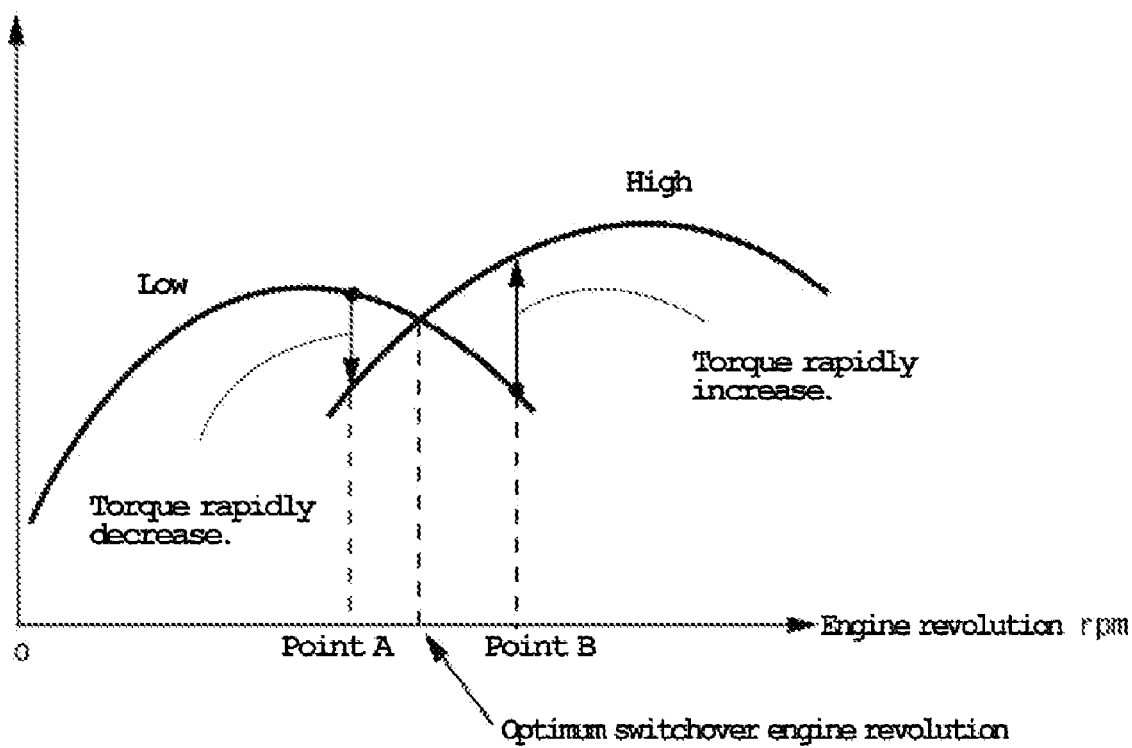
FIG. 17 explains open-and-close valve actions.
Figure 18:
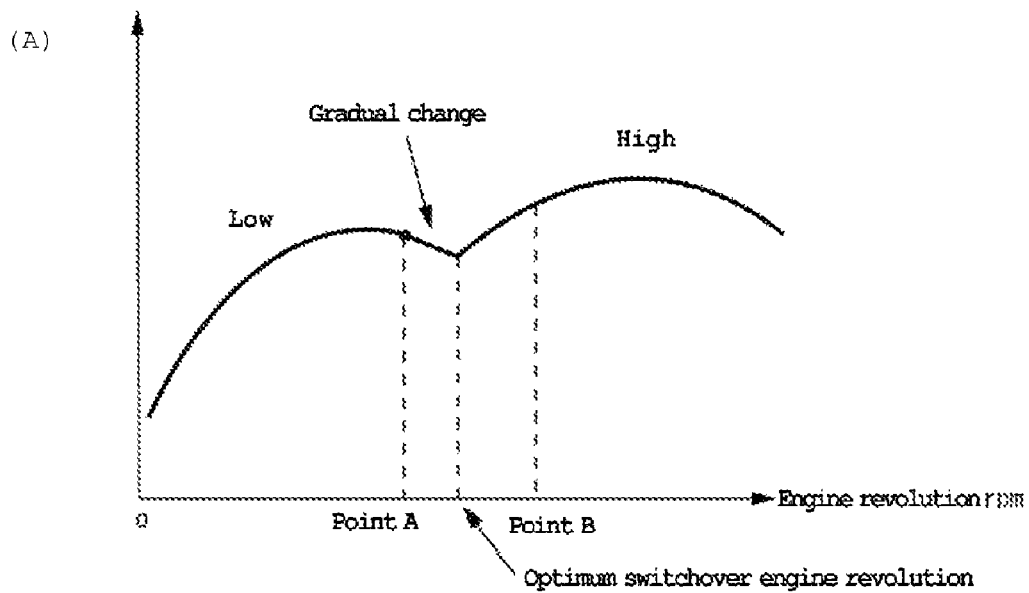
FIGS. 18A and 18B are graphs of the engine output when the open-and-close valve action is slowed down.
Figure 18:
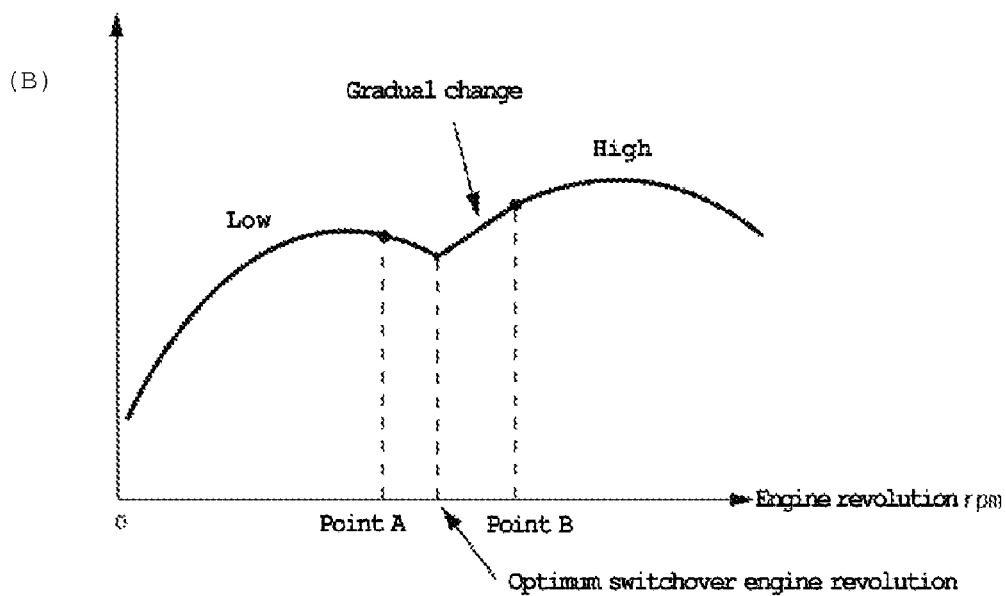
Figure 19:
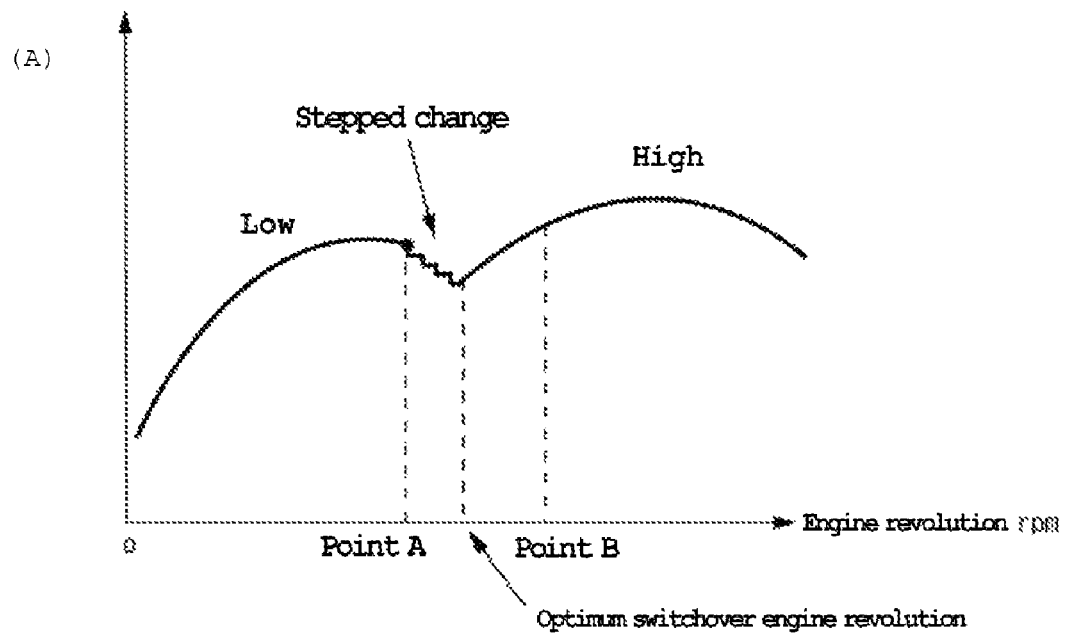
FIGS. 19A and 19B are graphs of the engine output when the stop position of the open-and-close valve is changed.
Figure 19:
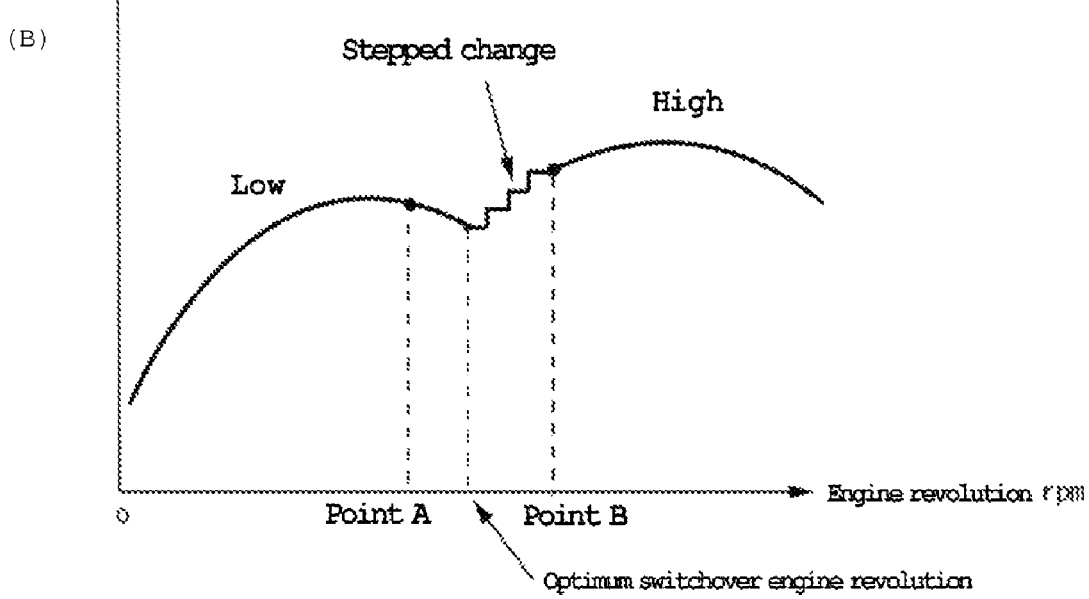

FIGS. 12 through 19 are drawings for explaining a v-type, vertical crankshaft engine on which a boat propulsion unit controller according to a preferred embodiment of the present invention may be mounted. FIG. 12 is a side view of the engine layout of the boat propulsion unit. FIG. 13 is a plan view of the engine layout of the boat propulsion unit. FIG. 14 is a front view of the engine layout of the boat propulsion unit. FIG. 15 shows a cross section of the intake structure. FIG. 16 shows a vertical section of the intake structure. FIG. 17 is a graph for explaining the action of the open-and-close valve. FIG. 18 is a graph of the engine output when the open-and-close valve action is slowed down. FIG. 19 is a graph of the engine output when the stop position of the open-and-close valve is changed.

The v-type engine 10 with a vertical crankshaft of the present preferred embodiment preferably is, as shown in FIGS. 12 through 16, a four-stroke cycle, V-8 engine. A crankcase 31 is connected to the front mating surface of a cylinder block 30 of the engine 10. A crankcase cover 31a is connected to the crankcase 31. A cylinder head 32 is connected to the rear mating surface of the cylinder block 30. The opening on the cam chamber side of the cylinder head 32 is covered with a head cover 33. When the boat runs, the head cover 33 and the cylinder head 32 of the engine 10 are directed rearward in the longitudinal direction of the hull. A flywheel 100 is attached to the crankshaft 10a in the upper portion of the engine 10.

In the cylinder block 30 are provided left and right groups or banks of cylinders 10b arranged in a V shape with their axes oriented in the direction of the crankshaft 10a. An intake valve opening 32a and an exhaust valve opening 32b for each cylinder are arranged in the cylinder head 32. The intake valve opening 32a and the exhaust valve opening 32b are connected to a combustion chamber 32d of each cylinder.

The exhaust valve openings 32b are connected through exhaust ports 32c to the space between the cylinder banks and collectively connected for each bank to a first exhaust passage 34A and a second exhaust passage 34B. Exhaust gas is discharged through the first and second exhaust passages 34A and 34B into the water under the engine.

The intake valve openings 32a are connected through intake ports 32e to the side wall of the cylinder head 32. A first group of intake manifold branches 36A are connected to outer connection openings 32f of intake ports 32e on one bank side, and a second group of intake manifold branches 36B are connected to outer connection openings 32f of intake ports 32e on the other bank side. In this way, one curved portion 39 curving from the intake valve opening 32a in a nearly arcuate shape toward the front of the hull is provided with one intake port 32e and the first intake manifold branch 36A; and another curved portion 39 is provided with the other intake port 32e and the second intake manifold branch 36B. Both of the curved portions 39 are connected to a surge tank 200. Thus, the first intake passage A1 and the second intake passage A2 extend forward. The surge tank 200 is connected to a throttle body 37 including a throttle valve 37a. An intake silencer 38 is connected to the upstream side of the throttle body 37. The intake silencer 38 is disposed in the front portion of the engine 10 extending almost the entire width of cowling 3 to draw air through its air intake opening 38a.

Next, the surge tank 200, the first group of intake manifold branches 36A, and the second group of intake manifold branches 36B are described in detail according to FIGS. 15 and 16. The surge tank 200 includes a first surge tank 200a and two second surge tanks 200b, all of them preferably made of an aluminum die casting having a specified capacity, extending vertically corresponding to both groups of intake manifold branches 36A and 36B. A long intake duct 36a and a short intake duct 36b are provided in each of the intake manifold branches 36A and 36B.

The first surge tank 200a is located on the front side or the hull side of the engine 10. The first surge tank 200a is connected to the respective long intake ducts 36a. The respective long intake ducts 36a are connected to the intake ports 32e of respective groups of cylinders 10b. Each of the intake ports 32e is provided on the outer side of each row of cylinders of the v-type engine 10. The two second surge tanks 200b are connected to the first surge tank 200a, and disposed within space K2 along the inner side or on the engine side of the long intake duct 36a. The two second surge tanks 200b located on both sides of the first surge tank 200a are connected to each other so as to have a large capacity. In the v-type engine 10, since the long intake duct 36a is located outside the row of cylinders, the space surrounded with the row of cylinders, the crankcase 31, and the long intake duct 36a remains unused. Therefore, the two second surge tanks 200b extend from the crankcase cover 31a to about the middle of the crankcase 31, so that the capacity of the second surge tanks 200b may be secured without enlarging the size of the boat propulsion unit 1.

Each of the short intake ducts 36b extends up to the inside of the second surge tank 200b, is located inside the middle portion of the long intake duct 36a or on the engine side, and is connected through an opening 200c to each of the second surge tanks 200b. The opening 200c of the short intake duct 36b opening to the long intake duct 36a on one side is provided with a first switch or an open-and-close valve 201A for opening and closing the short intake duct 36b on the one side. The opening 200c of the short intake duct 36b opening to the long intake duct 36a on the other side is provided with a second switch or an open-and-close valve 201B for opening and closing the short intake duct 36b on the other side. Both the open-and-close valves 201A and 201B are provided on valve shafts 202 disposed vertically through the valves 201A and 201B. A first motor-operated driver or actuator 203A is provided at the upper end of the valve shaft 202 on one side, and a second motor-operated driver or actuator 203B is provided at the upper end of the valve shaft 202 on the other side. The actuators 203A and 203B rotate the valve shafts 202 to open and close the openings 200c via the open-and-close valves 201A and 201B.

Disposing the actuators 203A and 203B coaxially with the valve shafts 202 of the open-and-close valves 201A and 201B reduces the number of components and costs, makes a direct connection possible, and improves functional reliability. In the present preferred embodiment, the open-and-close valves 201A and 201B are of a butterfly type connected to a single valve shaft 202 extending in the crankshaft 10a direction. Drive motors are preferably used as the actuators 203A and 203B disposed at the upper ends of the valve shafts 202, and are preferably, for example, DC motors or stepping motors. The actuators 203 may be disposed directly under the open-and-close valves 201A and 201B. In the case the actuators 203A and 203B are disposed directly above the open-and-close valves 201A and 201B, the actuators 203A and 203B may be placed in the otherwise unused space K1 surrounded by the uppermost intake manifold branches 36A and 36B, flywheel 100, and top cowling 3a. In the case the actuators 203A and 203B are disposed directly below the open-and-close valves 201A and 201B, they may be placed in the otherwise unused space K1 surrounded by the lowermost intake manifold branches 36A and 36B and bottom cowling 3b. Thus, the actuators 203A and 203B may be attached without increasing the external size of the cowling 3.

The engine 10 is provided with electric components 300 such as a controller, and auxiliary electric devices 301 such as relays and fuses. The electric components 300 are attached to central and upper portions of the front wall of the surge tank 200 via a mounting boss 200f and disposed within the cowling 3 so as to receive detected values from various sensors (not shown), such as, an engine revolution sensor, a boat speed sensor, a throttle opening degree sensor, an intake air pressure sensor, and an $O_2$ sensor to control the fuel injection rate, injection timing, and ignition timing based on various built-in operation control maps using the operation state information or the detected values, and to open and close the openings 200c using the open-and-close valves 201A and 201B by controlling the actuators 203A and 203B. The auxiliary electric devices 301 such as relays and fuses are attached to the right upper portion of the front wall of the surge tank 200 and disposed within the cowling 3.

As described above, it is possible to independently control the paired right and left actuators 203A and 203B according to the operation state information, to open and close the openings 200c using the open-and-close valves 201A and 201B so as to open the open-and-close valves 201A and 201B, for example in high speed operation, close the valves 201A and 201B in low to medium speed operation, and switch the intake duct length between a length suited for the low to medium speed operation and a length suited for the high speed operation. This makes it possible to obtain the intake duct length suited for the operating state of the engine 10, obtain an inertia supercharging effect over the entire operation range of the engine 10, and obtain intended torque characteristics.

The control of opening and closing the open-and-close valves 201A and 201B may be performed according to the engine revolution or load, or both. Further, the speed of opening and closing the open-and-close valves 201A and 201B may be arbitrarily set depending on the operation range.

Because the chambers of the cylinders of an engine are usually ignited at different time points, appropriate timing for switching the intake duct length is different between the right and left banks of cylinders. Because the controller 800 defined by the electric components 300 as shown in FIG. 15 controls the paired right and left actuators 203A and 203B according to the information on the operating conditions and independently drives the paired right and left open-and-close valves 201A and 201B for switching between the long intake duct 36a and the short intake duct 36b, the intake duct length may be switched over at different times for the right and left banks of cylinders, so that the engine is controlled at appropriate different switchover time points for the right and left groups or banks of cylinders.

As shown in FIG. 17, when the effective length of the intake duct is switched over between low-to-medium and high speed operation ranges, there is a possibility of a switchover error to occur. For example, if a switchover is done at an engine revolution indicated at the point A, the switchover is too early and the torque decreases rapidly. If the switchover is done at an engine revolution indicated at the point B, the switchover is too late and the torque increases rapidly, resulting in a shift shock. In particular for a boat propulsion unit often used at full throttle, the shift shock tends to be remarkable.

Therefore, with the present preferred embodiment, the operating speed of the open-and-close valves 201A and 201B is delayed as shown in FIGS. 18A and 18B. In the case a switchover is done at an engine revolution indicated at the point A as shown in FIG. 18A, for example, because the switchover is delayed, the torque decreases gradually. In the case a switchover is done at an engine revolution indicated at the point B as shown in FIG. 18B for example, because the switchover is delayed, the torque increases gradually so that the shift shock is alleviated.

As further shown in FIGS. 19A and 19B, the stop position of the open-and-close valves 201A and 201B is changed in steps. In the case a switchover is done at an engine revolution indicated at the point A, for example, as shown in FIG. 19A, because the switchover stop position is changed in steps, the torque decreases gradually. In the case a switchover is done at an engine revolution indicated at the point B, for example, as shown in FIG. 19B, because the switchover stop position is changed in steps, the torque increases gradually so that the shift shock is alleviated.

The control of the present preferred embodiment may be performed independently for the right and left sides according to the information on the operating condition. Further, the operation speed and the valve stop position may be arbitrarily chosen according to the information on the operating condition. Therefore, it is possible to carry out engine output control with high accuracy or to alleviate shift shocks at the time of switching the open-and-close valves 201A and 201B.

As further shown in FIG. 13, because the second surge tank 200b is disposed along the engine side of the long intake duct 36a, curvature of the long intake duct 36a remains at a minimum. Further, because there is less restriction on the shape of the first surge tank 200a disposed on the hull side of the engine 10 in comparison with the first intake manifold branch 36A and the second intake manifold branch 36B, it is possible to dispose the surge tank 200 while utilizing a maximum of the space between the long intake duct 36a and the engine 10, narrow the distance to the engine 10, and as a result, prevent the boat propulsion unit 1 from increasing in size. Further, because the open-and-close valves 201A and 201B for opening and closing the short intake duct 36b are located inside the long intake duct 36a or on the engine side, the actuators 203A and 203B for driving the open-and-close valves 201A and 201B may be disposed more on the engine side than the outer side of the long intake duct 36a as seen in a plan view and prevent the boat propulsion unit 1 from increasing in size due to the protrusion of the actuators 203A and 203B. Thus, it is possible to change the effective length of the intake duct without increasing the size of the boat propulsion unit 1.

With the present preferred embodiment, a position sensor or the first switching position detector S1A detects the position of the first switch or the open-and-close valve 201A at the time of the duct length switchover, and sends the detected information to the controller 800. Also, a position sensor or the second switching position detector S1B detects the position of the second switch or the open-and-close valve 201B at the time of the duct length switchover, and sends the detected information to the controller 800. The controller 800 determines from the information detected with the first and second switching position detector S1A and S1B whether or not one of the switching position detectors has failed. In the case either of the two has failed, both the first and second open-and-close valves 201A and 201B are driven to switch the intake ducts to the long intake ducts 36a. If either of the first and second switching position detector S1A and S1B has failed as described above, both the first and second open-and-close valves 201A and 201B, or the first and second switches, are driven to switch respective intake ducts to the long intake ducts 36a so that it is possible to simultaneously control the operating condition of both banks of cylinders and maintain stabilized operating conditions.

With the present preferred embodiment, the controller 800 has a failure detector 800A which compares the output of the first switching position detector S1A with the output of the second switching position detector S1B. In the case the difference between the output values continues for a specified period of time or longer, a failure is determined to have occurred. Thus, the failure is determined easily with high accuracy. It is also possible to change the reference value of the specified period of time or the reference range of a difference in the output values according to the engine revolution 10 so as to determine the failure with higher accuracy.

In the case the failure detector 800A determines, according to the information detected with the first and second switching position detector S1A and S1B, that although both the first and second switching position detectors S1A and S1B have not failed, either of the first and second motor-operated drives has failed, the controller 800 stops energizing both the first and second motor-operated drives, and compensates the fuel supply rates to respective banks of cylinders according to the output values of the first and second switching position detectors S1A and S1B. This makes it possible, even when the switch operated with the motor-operated driver fails, to maintain both the banks of cylinders in an optimum state corresponding to the state of the switches, so that the engine 10 is in a stabilized operating state.

As shown in FIG. 15, spaces K3 and K4 in a plan view are provided between the cylinder block 30 of the engine 10 and the right and left long intake ducts 36a. Large sized electric components 400 as auxiliary components such as a starter motor, etc., are preferably disposed in the space K3. Fuel system components 401 are preferably disposed in the space K4. A fuel injection valve 40 is inserted in a portion near the intake port 32e of the cylinder head 32 of each cylinder bank. An injection nozzle of the fuel injection valve 40 faces the combustion chamber 32d, with a cylindrical fuel supply rail 41 disposed in the direction of the crankshaft 10a outside the cylinder head 32.

A fuel supplying device 50 for supplying fuel to the fuel injection valve 40 is described below. To the front portion of the side wall of the engine 10 are attached a fuel filter 57, a low-pressure primary pump 52 installed in a sealed container 58 for supplying fuel, and a vapor separator 53. In the fuel supplying device 50, fuel in a fuel tank 55 mounted on the hull side is supplied as the low-pressure primary pump 52 is driven through a low-pressure fuel pipe 54a, the fuel filter 57, a low-pressure fuel pipe 54b, and the primary pump 52 to the vapor separator 53. Surplus fuel delivered out of the delivery port 52a of the primary pump 52 is returned through a return passage 52b to a suction port 52c of the primary pump 52.

As the primary pump 52 installed in the vapor separator 53 is driven, fuel is supplied through a fuel supply pipe 56 to a high pressure secondary pump 42. Fuel pressurized by the secondary pump 42 is supplied through a high pressure fuel pipe 43 and right and left branch hoses 44 to the upper ends of right and left fuel supply rails 41. For a period of time that the injection nozzle of the fuel injection valve 40 is open, fuel is injected into the combustion chamber 32d.

A canister 60 is attached to the vapor separator 53. The canister 60 includes a case 60a connected to the vapor separator 53 and filled with adsorption active agent 60b such as activated carbon. Vapor in the vapor separator 53 flows into the canister 60 where fuel in the vapor is adsorbed. Air from which fuel is removed by adsorption flows through a discharge pipe 61 and is discharged to the inside of the cowling 3. The canister 60 is located below the left hand intake manifold 36. The vapor separator 53 and the canister 60 defining the fuel system component 401 are located as shown in FIGS. 12, 14, and 15, in the space K4 surrounded by the V banks on the left side of the cylinder block 30 in a compact layout.

The fuel filter 57 is disposed within the cowling 3 on one side of the crankshaft 10a of the engine 10 opposite the cylinder head 32, on the hull side of the engine 10, and on the hull side of the intake silencer 38. The fuel filter 57 includes a main portion 57a, a cap portion 57b, and a filter portion, with the main portion 57a secured to a bracket 59. The bracket 59 is secured to the hull side of the surge tank 200. A recessed portion of the main portion 57a is provided with a female thread, and the attachment portion of the cap portion 57b is provided with a male thread, to be attached to or removed from each other as required. The main portion 57a is provided with a supply opening 57a2 and a discharge opening 57a3. The low-pressure fuel pipe 54a is connected to the supply opening 57a2. The low-pressure fuel pipe 54b is connected to the discharge opening 57a3.

The fuel filter 57 is covered with at least an insulating member 70 formed to fit the shape of the fuel filter 57. The insulating member 70 includes a portion 70a covering the main portion 57a and a portion 70b covering the cap portion 57b, so that both portions cover the fuel filter 57. The fuel filter 57 is located below the air intake opening 38a of the intake silencer 38 that is open to the inside of the cowling 3. While air (X) flows from an air inlet 3a1 toward the intake opening 38a of the intake silencer 38 and also air (Y) heated by the engine 10 flows in the engine compartment 15, the fuel filter 57 is further prevented from being heated because the fuel filter 57 is in a position not affected by the flow.

At least a portion of the fuel pipe 54 connected to the fuel filter 57, or the fuel pipes 54a and 54b, is also covered with insulating members 71 and 72. The fuel pipe 54a passes through the right front side 3b11 of the bottom cowling 3b, extends to the right inside of the bottom cowling 3b, curves to pass below and near the surge tank 200, curves up from under the fuel filter 57, and is connected from the left side of the fuel filter 57 to the supply opening 57a2. The fuel pipe 54b is connected to the discharge opening 57a3 on the right side of the fuel filter 57, extends downward from the right side of the fuel filter 57, passes below the fuel filter 57, extends left, and is connected to the primary pump 52 installed in the sealed container 58.

As shown in FIGS. 12 and 14, otherwise unused space K2 around the fuel filter 57 and below the surge tank 200 is utilized to route the low pressure fuel pipe 54a and the low pressure fuel pipe 54b extending from the fuel filter 57 to the primary pump 52 for suctioning fuel out of the fuel tank 55 mounted on the hull side. The low pressure fuel pipe 54a and the low pressure fuel pipe 54b extending from the fuel filter 57 to the primary pump 52 are covered with the insulating members 71 and 72, so that not only the fuel filter 57 but also at least a portion of the fuel pipe 54 helps prevent heating of the fuel.

The preferred embodiments of the present invention are applicable to the controller of boat propulsion units in which a long intake duct and a short intake duct for drawing air into an engine are switched. The engine performance may be maintained as much as possible even if duct length switchover fails due to frequent duct length switchover actions.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A controller for a boat propulsion unit comprising:
a switch arranged to switch between a long intake duct and a short intake duct to draw intake air into an engine of the boat propulsion unit;
a motor-operated driver arranged to drive the switch;
a duct length switching position sensor arranged to detect a position of the switch at the time of switching the duct length;
a fuel supply arranged to supply fuel to the engine;
a sensor failure detector arranged to detect a failure of the duct length switching position sensor based on an output from the duct length switching position sensor; and
a controller arranged to compensate a fuel supply rate based on the switch position detected at the time of switching the duct length; wherein
the controller switches to the long intake duct when the duct length switching position sensor fails, and compensates the fuel supply rate using a sensor output quasi value corresponding to the time of switching to the long intake duct.

2. A controller for a boat propulsion unit comprising:
a switch arranged to switch between a long intake duct and a short intake duct to draw intake air into an engine of the boat propulsion unit;
a motor-operated driver arranged to drive the switch;
a duct switching position sensor arranged to detect a position of the switch at the time of switching the duct length;
a fuel supply arranged to supply fuel to the engine;
a failure detector arranged to detect a failure of the motor-operated driver based on an output from the duct length switching position sensor; and
a controller arranged to compensate a fuel supply rate based on the switch position detected at the time of switching the duct length; wherein
the controller stops energizing the motor-operated driver when the motor-operated driver fails, and compensates the fuel supply rate based on the output of the duct length switching position sensor.

3. A controller for a boat propulsion unit comprising:
a first intake duct arranged to draw intake air, disposed on a first bank side of an engine having a substantially v-shaped configuration with a vertically disposed crankshaft of a boat propulsion unit;
a second intake duct arranged to draw intake air disposed on a second bank side of the engine;
a first switch arranged to switch between a long intake duct and a short intake duct provided in the first intake duct;
a second switch arranged to switch between a long intake duct and a short intake duct provided in the second intake duct;
a first motor-operated driver arranged to drive the first switch;
a second motor-operated driver arranged to drive the second switch;
a first switching position detector arranged to detect a position of the first switch when switching the duct length;
a second switching position detector arranged to detect a position of the second switch when switching the duct length; and
a controller arranged to drive both the first switch and the second switch when either the first switching position detector or the second switching position detector fails and to switch the first and second intake ducts to the long intake duct.

4. The controller for the boat propulsion unit of claim 3, further comprising a failure detector arranged to compare an output of the first switching position detector with an output of the second switching position detector, wherein the failure detector determines the occurrence of a failure when both the output values are different for a specified period of time or longer.

5. The controller for the boat propulsion unit of claim 4, wherein a reference value of the specified period of time, or a reference range of a difference in the output values is changed according to an engine revolution speed.

6. The controller for the boat propulsion unit of claim 3, wherein the controller is arranged to stop energizing both the first motor-operated driver and the second motor-operated driver when either the first motor-operated driver or the second motor-operated driver fails, and compensate fuel supply rates to cylinders of the first and second banks based on the respective outputs of the first switching position detector and the second switching position detector.

* * * * *